US011304249B2

(12) United States Patent
Kanamarlapudi et al.

(10) Patent No.: US 11,304,249 B2
(45) Date of Patent: Apr. 12, 2022

(54) BUFFER MANAGEMENT TECHNIQUES FOR ENHANCED MULTI-CONNECTIVITY COMMUNICATIONS

(71) Applicant: QUALCOMM INCORPORATED, San Diego, CA (US)

(72) Inventors: Sitaramanjaneyulu Kanamarlapudi, San Diego, CA (US); Arnaud Meylan, San Diego, CA (US); Shailesh Maheshwari, San Diego, CA (US); Arun Prasanth Balasubramanian, San Diego, CA (US); Vishal Dalmiya, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 211 days.

(21) Appl. No.: 16/715,514

(22) Filed: Dec. 16, 2019

(65) Prior Publication Data

US 2021/0185747 A1  Jun. 17, 2021

(51) Int. Cl.
*H04W 76/15* (2018.01)
*H04W 36/00* (2009.01)
(Continued)

(52) U.S. Cl.
CPC .......... *H04W 76/15* (2018.02); *H04L 1/1642* (2013.01); *H04W 28/0278* (2013.01);
(Continued)

(58) Field of Classification Search
CPC ............. H04W 76/15; H04W 36/0058; H04W 28/0278; H04W 36/30; H04W 52/365;
(Continued)

(56) References Cited

U.S. PATENT DOCUMENTS 10,433,222 B1* 10/2019 Marupaduga ....... H04W 52/241
2009/0104919 A1* 4/2009 Heater .................... H04W 4/18
455/456.1
(Continued)

OTHER PUBLICATIONS

International Search Report and Written Opinion—PCT/US2020/046903—ISA/EPO—dated Nov. 4, 2020.
(Continued)

*Primary Examiner* — Kiet Tang
(74) *Attorney, Agent, or Firm* — Haynes and Boone, LLP

(57) ABSTRACT

Wireless communications systems and methods related to buffer/memory management for multi-connectivity in a wireless communication network are provided. A wireless communication device transmits a first portion of a plurality of data packets using a first radio access technology (RAT). The wireless communication device transmits a second portion of the plurality of data packets using a second RAT different from the first RAT. The wireless communication device stores at least some of the plurality of data packets in a memory pending an acknowledgement (ACK) indication associated with at least a first data packet of the plurality of data packets. The wireless communication device determines a transmission configuration for at least the first data packet and a second data packet based on whether a threshold occupancy of the memory is satisfied. Other aspects and features are also claimed and described.

28 Claims, 12 Drawing Sheets

(51) Int. Cl.
*H04L 1/16* (2006.01)
*H04W 28/02* (2009.01)
*H04W 36/30* (2009.01)
*H04W 52/36* (2009.01)
*H04W 80/08* (2009.01)

(52) U.S. Cl.
CPC ....... *H04W 36/0058* (2018.08); *H04W 36/30* (2013.01); *H04W 52/365* (2013.01); *H04W 80/08* (2013.01)

(58) Field of Classification Search
CPC ..... H04W 80/08; H04W 76/22; H04W 76/16; H04W 36/005; H04L 1/1642
See application file for complete search history.

(56) References Cited

U.S. PATENT DOCUMENTS

| | | | |
|---|---|---|---|
| 2010/0309788 A1 | 12/2010 | Ho et al. | |
| 2011/0255512 A1* | 10/2011 | Lee | H04W 36/005 370/331 |
| 2012/0039176 A1 | 2/2012 | Eshan et al. | |
| 2013/0329583 A1 | 12/2013 | Vrzic et al. | |
| 2014/0036808 A1 | 2/2014 | Pelletier et al. | |
| 2014/0185480 A1* | 7/2014 | Lee | H04W 36/30 370/252 |
| 2015/0117357 A1* | 4/2015 | Ozturk | H04W 24/10 370/329 |
| 2017/0118793 A1* | 4/2017 | Liu | H04W 76/16 |
| 2017/0325124 A1 | 11/2017 | Mitra et al. | |
| 2017/0353950 A1* | 12/2017 | Song | H04L 1/18 |
| 2018/0324642 A1* | 11/2018 | Yu | H04W 76/15 |
| 2020/0382846 A1 | 12/2020 | Zhou | |
| 2021/0067456 A1 | 3/2021 | Meylan et al. | |

OTHER PUBLICATIONS

International Search Report and Written Opinion—PCT/US2020/065316—ISA/EPO—dated Apr. 7, 2021.

* cited by examiner

BUFFER MANAGEMENT TECHNIQUES FOR ENHANCED MULTI-CONNECTIVITY COMMUNICATIONS

TECHNICAL FIELD

The technology described below relates generally to wireless communication systems, and more particularly, to buffer management for multi-connectivity scenarios (e.g., dual connectivity) in a wireless communication network. Certain embodiments can enable and provide techniques allowing communication devices (e.g., user equipment devices or base stations) to efficiently use and/or minimize buffer memory usage (e.g., in multi- or dual connectivity scenarios with a split radio bearer configuration) while providing high throughput performance, power conservation, minimized network overhead, and/or improved user experience.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR is also designed to support dual connectivity with LTE via a split bearer configuration. For instance, a UE may be simultaneously connected to an NR BS and an LTE BS for uplink and/or downlink communications. A radio bearer is a service provided by Layer 2 to transport user data packets and/or signaling data between a UE and a network. A radio bearer that transports user data may be referred to as a data radio bearer (DRB). A radio bearer that transports signaling data may be referred to as a signaling radio bearer (SRB). A split bearer in dual connectivity refers to a radio bearer that transports data between a UE and a network via two radio interface protocols over two wireless communication links (e.g., a NR link and an LTE link).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques enabling improved communication and operational performance. Such improvements may be brought about via disclosed aspects, embodiments, and techniques for efficiently using memory and/or minimizing memory usage. In some cases, and as discussed below in additional detail, a memory can be or include a buffer memory.

Some deployments can be used in scenarios that utilize a split radio bearer for communication in a wireless communication network. For instance, a wireless communication device may control an amount of data being routed through a first wireless communication link of a first radio access technology (RAT) (e.g., long term evolution (LTE)) and/or an amount of data being routed through a second wireless communication link of a second RAT (e.g., new radio (NR)). Data amount control techniques can enable and allow amounts of data buffered at a memory (e.g., buffer memory) to be minimized while providing an optimal throughput performance across the first and second wireless communication links.

A wireless communication device may also prioritize transmission and/or scheduling grants across multiple communication links (e.g., first and second wireless communication links) based on a threshold occupancy of a memory (such as a buffer memory). For example, in an aspect of the disclosure, a method of wireless communication includes transmitting, by a wireless communication device, a first portion of a plurality of data packets using a first radio access technology (RAT). The plurality of data packets can be ordered and/or have an order (e.g., may be given unique sequence data and/or numbers).

Method embodiments may also have additional features. For example, a method may also include transmitting, by the wireless communication device, a second portion of the plurality of data packets using a second RAT different from the first RAT. A method may also include storing, by the wireless communication device, at least some of the plurality of data packets in a buffer memory pending an acknowledgement (ACK) indication associated with at least a first data packet of the plurality of data packets. A method may also include determining, by the wireless communication device, a transmission configuration for at least the first data packet and a second data packet based on whether a threshold occupancy of the buffer memory is satisfied.

In an additional aspect of the disclosure, a method of wireless communication includes transmitting, by a wireless communication device to a network, a first portion a plurality of data packets via a first wireless communication link using a first radio access technology (RAT), the plurality of data packets having an order. The method may also include transmitting, by the wireless communication device to the network, a second portion of the plurality of data packets via a second wireless communication link using a second RAT, the second wireless communication link being different from the first wireless communication link, and the second RAT being different from the first RAT. The method may also include detecting, by the wireless communication device, an upcoming handover. The method may also include storing, by the wireless communication device in response to the detecting, at least some of the plurality of data packets in a buffer memory of the wireless communication device pending an acknowledgement (ACK) indication associated with at least a first data packet of the plurality of data packets.

In an additional aspect of the disclosure, an apparatus includes a transceiver configured to transmit a first portion of a plurality of data packets using a first radio access technology (RAT), the plurality of data packets having an order. The transceiver is also configured to transmit a second portion of the plurality of data packets using a second RAT different from the first RAT. The apparatus may also include a buffer memory configured to store at least some of the plurality of data packets pending an acknowledgement (ACK) indication associated with at least a first data packet of the plurality of data packets. The apparatus may also include a processor configured to determine a transmission configuration for at least the first data packet and a second data packet based on whether a threshold occupancy of the buffer memory is satisfied.

In an additional aspect of the disclosure, an apparatus includes a transceiver configured to transmit, to a network, a first portion a plurality of data packets via a first wireless communication link using a first radio access technology (RAT), the plurality of data packets having an order. The transceiver is also configured to transmit, to the network, a second portion of the plurality of data packets via a second wireless communication link using a second RAT, the second wireless communication link being different from the first wireless communication link, and the second RAT being different from the first RAT. The apparatus may also include a processor configured to detect an upcoming handover. The apparatus may also include a memory configured to store, in response to the detection, at least some of the plurality of data packets pending an acknowledgement (ACK) indication associated with a first data packet of the plurality of data packets.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
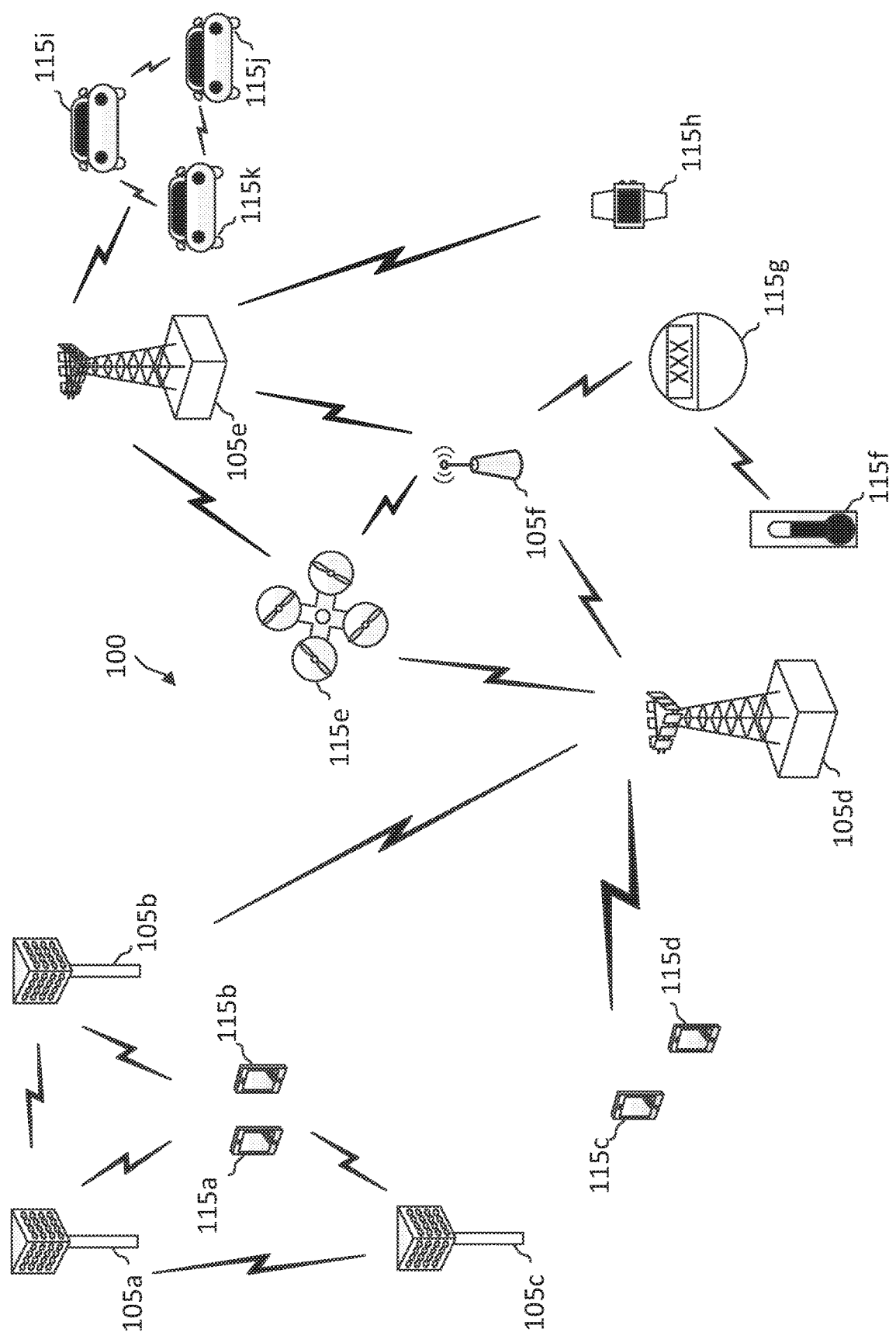
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a user equipment (UE) may be configured to operate in a multi-connectivity mode (e.g., a dual connectivity mode) using a split radio bearer configuration. In such a mode, a UE can be connected to a network via two separate radio interface protocols of different radio access technologies (RATs). In some scenarios, a UE may be connected to network via a LTE radio interface protocol and an NR radio interface protocol. Each of the LTE radio interface protocol or the NR radio interface protocol may include a packet data convergence protocol (PDCP) layer, a radio link control (RLC) layer, a medium access control (MAC) layer, and a physical (PHY) layer. The PDCP, RLC, and MAC layers may be referred to as Layer 2 (L2). The PHY layer may be referred to as Layer 1 (L1).

In an uplink (UL) split bearer configuration, a UE can maintain a single PDCP entity. This PDCP entity can route data (received from an upper layer such as an application layer) via multiple (e.g., two) separate radio interface protocol entities to the network. The PDCP entity may route data to the network via an LTE radio interface protocol entity over an LTE link and/or an NR radio interface protocol entity over an NR link. The PDCP entity may perform sequence numbering by associating each packet with a sequence number in an ascending order prior to transmission to the lower layers (e.g., the LTE RLC or the NR RLC).

According to some wireless communication protocols, a PDCP entity can buffer a sequence of data packets. These data packets can be transmitted over-the-air (OTA) beginning from a first PDCP packet data unit (PDU). If successful delivery of a corresponding PDCP PDU has not been confirmed (e.g., pending an acknowledgement (ACK)) by a lower layer. In other words, the PDCP entity may not release, discard, or free an acknowledged data packet from a buffer if a data packet with a lower sequence number is pending on an ACK. This buffering approach may enable a lossless handover. For instance, when a source BS does not forward the packets that are successfully received from the UE to a target BS during handover, the UE may retransmit the packets stored at the buffer to the target BS after the handover.

When multiple RATs have different throughputs (e.g., data rates) and/or the associated communication links have different channel characteristics, communication characteristics can vary. For example, data packets may be transmitted at a faster or slower rate over one link than another link. Additionally, data packets transmitted over one link may be acknowledged and/or with less retransmissions than data packets transmitted over another link. And multiple RATs may operate at different automatic repeat request (ARQ) timelines (e.g., acknowledgement/negative acknowledgements (ACK/NACKs) timelines, retransmission timelines, and/or ACK/NACK status polling timelines). As such, a link with a higher throughput, faster ARQ timeline, and/or better channel condition may continue to transmit new data packets with sequence number advancing and receive ACKs. Whereas a link with a lower throughput, slower ARQ timeline, and/or poor channel condition may continue to wait for ACKs for packets in a lower sequence number range. Since a PDCP entity cannot release an acknowledged data packet from buffer memory until all data packets in a lower sequence number range are acknowledged, the buffer memory can fill to capacity (or build up), potentially causing or causing a memory overflow. When buffer memory overflow occurs, data packets may be dropped, resulting in a lower throughput performance and poor user experience.

While a wireless communication protocol may consider a UE's and/or BS's buffering capability for multi-connectivity, for example, by limiting amounts of DL or UL data packets scheduled for communication at a given time, in practice, it may be challenging. This is because for a device or network to track UL and DL usages when operating in a multi-connectivity mode it involves multiple cells (e.g., two cells in a dual communication scenario). Additionally, while a wireless communication protocol may specify a minimum L2 buffer size requirement for a UE and schedule the UE according to the specified L2 buffer size, in practice, a UE may allocate a smaller buffer memory to minimize cost or for other reasons. Further, a UE may share the buffer memory with other processing, such as UL packet buffering, DL packet reordering, and/or other modem processing. Thus, even if a network attempts to assist a UE by pacing the scheduling based on the specified L2 buffer size, the UE may run out of memory sooner than as expected by the network.

Various mechanisms and techniques for efficiently using buffer memory that can yield improved operational performance are described herein. Certain deployments can occur at a UE and/or BS that utilize a split radio bearer for communication in a wireless communication network. For instance, a UE and/or BS may control data amounts routed through a first wireless communication link of a first RAT (e.g., LTE) and data amounts routed through a second wireless communication link of a second RAT (e.g., NR). Controlling amounts of routed data enables data buffering at a buffer memory to be minimized while providing an optimal throughput performance across communication links. A UE and/BS may prioritize transmission and/or scheduling grants across multiple communication links (e.g., first and second wireless communication links) based on a threshold occupancy of a buffer memory and/or memory. Threshold occupancy for memory storage may be in units of data bytes, in units of number of data packets, in units of PDCP sequence number space, and/or in units of a memory utilization percentage. Other memory-related aspects may be used too.

Data management controls can be made based on and/or as a function of a threshold occupancy associated with a memory. In some aspects, if the total number of bytes transmitted over the air (via a communication link such as an LTE link and/or an NR link) is greater than an occupancy threshold of M bytes, the UE may stop transmitting new packets at the PDCP level and expedite RLC transmission on the problematic or slower link (e.g., the LTE link). Determining when a memory has satisfied or reached an occupancy threshold may be based on several factors. Further, communication devices (such as a UE or BS) may take certain action upon determination that a threshold occupancy has been satisfied, close to being satisfied, and/or not satisfied.

In some aspects, if a PDCP buffer memory has reached or satisfied a certain occupancy threshold, the UE may perform an unsolicited retransmission at an RLC level. While the UE is waiting for RLC ACKs from the network, the UE may initiate a retransmission of a different version of an originally transmitted packet before an RLC ACK/NACK is received. Additionally or alternatively, the UE may poll the RLC receiver (of a base station) to send an RLC status before a standard RLC status trigger timeline so that the UE may receive an ACK/NACK at an earlier time.

In some aspects, if the PDCP buffer memory has reached or satisfied a certain occupancy threshold, the UE may perform an unsolicited retransmission at a PDCP level. While the UE is waiting for an RLC ACK for a packet transmitted via the slow link (e.g., the LTE link), the UE may identify the PDCP PDU corresponding to a data packet pending on ACK and initiate a retransmission of the data packet over the faster link (e.g., the NR link). Additionally, the UE may discard PDCP PDU after the retransmission.

In some aspects, if the PDCP buffer memory has reached or satisfied a certain occupancy threshold, the UE may slow down the transmission on the link (e.g., the NR link) that is ahead of the other link (e.g., the LTE link) in terms of RLC ACKs. A UE may simulate a degradation over the link that is ahead to reduce the throughput, for example, by reporting a lower power head room (PHR) to the network and/or using a lower transmission power level for transmissions over the link. Additionally or alternatively, the UE may discard a UL grant without a UL transmission. Additionally or alternatively, the UE may transmit a buffer status report (BSR) indicating a first data amount less than a second data amount ready for transmission at the UE.

In some aspects, if the PDCP buffer memory has reached or satisfied a certain occupancy threshold, the UE may duplicate a retransmission such that the retransmission can be over both links. While retransmissions of packets may continue at the RLC level on the same link as the packets were originally transmitted, the UE may initiate a retransmission of the packets over the other link (e.g., higher throughput or better SNR).

In some aspects, the UE may control the number of bytes being transmitted on each link such that both links are not more than M number of packets apart in terms of PDCP sequence numbers. For instance, the UE may route a greater number of data packets to the NR link with the higher throughput and/or higher SNR and route a reduced number of data packets to the LTE link with the lower throughput and/or lower SNR. A PDCP entity may determine the amount of data for transmission over the NR link and the amount of data for transmission over the LTE link based on a throughput ratio (e.g., a data rate ratio), a packet error rate ratio, a block error rate (BLER) ratio, and/or an SNR ratio between the NR link and the LTE link.

In some aspects, the UE may buffer transmitted packets at the PDCP buffer memory and apply the operations for controlling the amount of data to be routed through the first link (e.g., LTE link) and the amount of data to be routed through the second link (e.g., the NR link) discussed above when the UE detects a potential upcoming handover and continue until the handover is completed. The UE may skip buffering transmitted packets at the PDCP buffer memory when there is no potential upcoming handover. The UE may determine an upcoming handover based on reference signal received power (RSRP)/references signal received quality (RSRQ) measurements of a serving cell and/or a neighboring cell measurement report trigger.

The various principles and techniques discussed can be implemented in many types of communication devices. Indeed, while the present disclosure describes buffer management and/or scheduling in the context of a UE implementing a UL split radio bearer configuration, similar mechanisms may be applied at a network side (e.g., at a BS) implementing a DL split radio bearer configuration. Additionally, while the present disclosure describes buffer management and/or scheduling for a split radio bearer configuration between an LTE radio bearer and an NR radio bearer, similar mechanisms may be applied to radio bearers of other RATs. Further, techniques may be utilized by communication devices capable of carrying on multiple communication links simultaneously with varying networks or RATs.

Aspects of the present disclosure can provide several benefits. For example, controlling data amounts routed or split between communication links and/or the prioritization of transmissions and/or scheduling across the communication links based on a threshold occupancy of the buffer memory enables the UE to reduce the amount of buffer memory required to provide a certain throughput performance Reduction of memory size can be beneficial in device design and lead to associated speed, throughput, and/or processing gains. The disclosed embodiments can avoid packet loss or packet drop and/or improve throughput performance when utilizing a split radio bearer configuration. Additionally, the disclosed embodiments can improve radio resource utilization efficiency. For instance, packet drop at the PDCP buffer memory can cause retransmissions at an application level (e.g., TCP provides guaranteed in-order delivery) which may require more buffer memory usage than a PDCP or RLC retransmission. Further, the skipping of the packet buffering when no handover is imminent can avoid the buffer memory limitation, which can trigger modifications to the uplink transmissions and reduce UL throughput.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response.

The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may implement a split bearer in a ETURA NR-dual connectivity (EN-DC) configuration. A radio bearer is a service provided by Layer 2 to transport user data packets and/or signaling data between a UE and a network. A radio bearer that transports user data may be referred to as a data radio bearer (DRB). A radio bearer that transports signaling data may be referred to as a signaling radio bearer (SRB). The split bearer may transport data between a UE 115 and the network 100 via two radio interface protocols over two wireless communication links (e.g., a NR link and an LTE link). In NR and LTE radio interface protocols, Layer 2 may include several sublayers, such as a PDCP sublayer, a RLC sublayer, and a MAC sublayer. The PDCP sublayer may receive data packets from an upper layer (e.g., transmission control protocol/Internet protocol (TCP/IP) layer) and transport the data packets via the RLC sublayer, the MAC sublayer, and a physical (PHY) layer for OTA transmission. At the receiver side, data packets are received via a PHY layer, a MAC sublayer, an RLC sublayer, and a PDCP layer, which delivers the data packets to an upper layer. In a split bearer configuration, data may be split post-PDCP and transmitted through different RLC/MAC/PHY layers to a peer side as described in greater detail herein.

Figure 2:
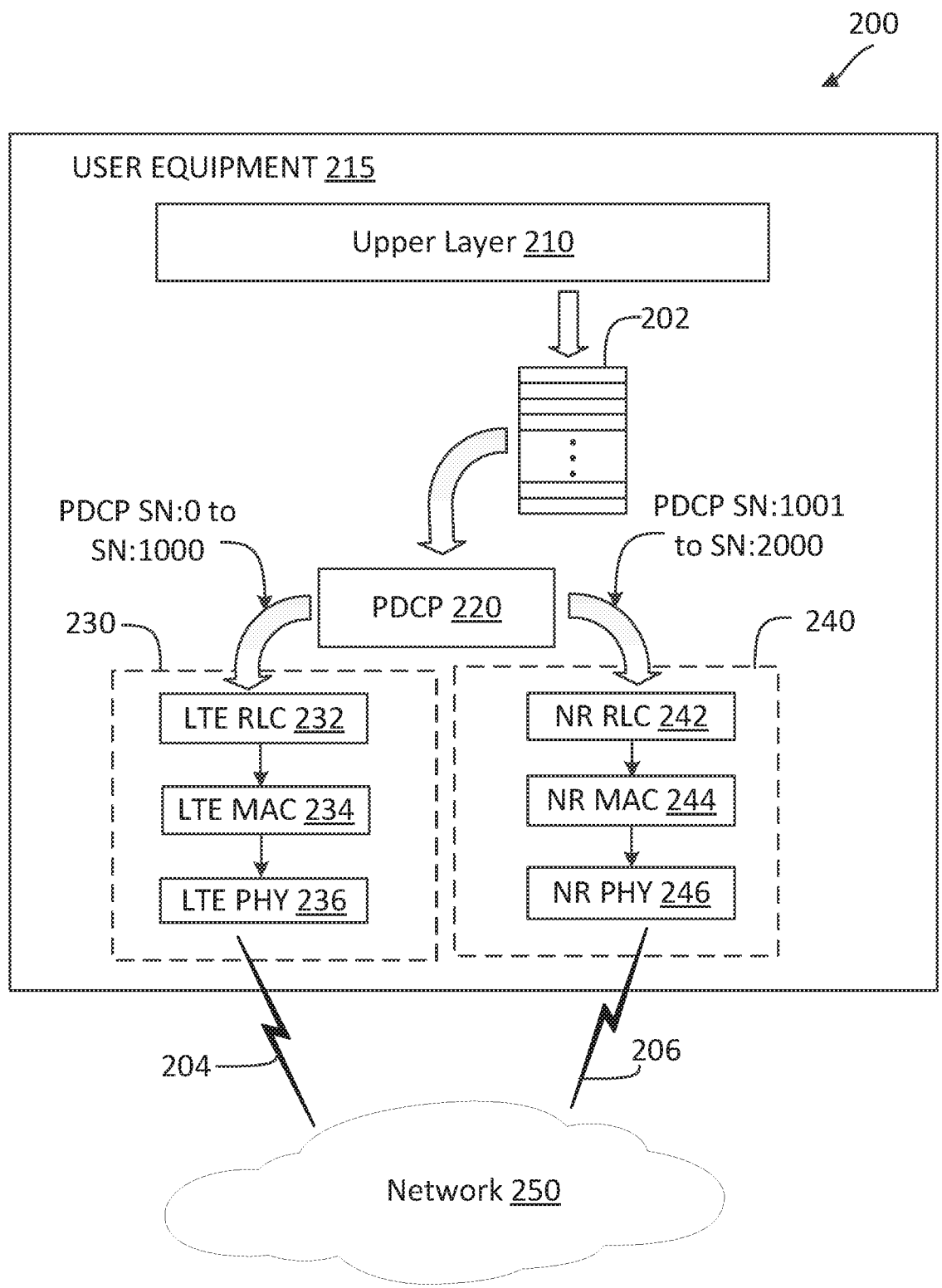
FIG. 2 illustrates a wireless communication network implementing dual connectivity with a split bearer configuration according to some aspects of the present disclosure.

FIG. 2 illustrates a wireless communication network 200 implementing dual connectivity with a split bearer configuration according to some aspects of the present disclosure. Though the figure shows a dual connectivity illustration, additional degrees of connectivity can be implemented too. The network 200 may correspond to a portion of the network 100. In particular, the network 200 may configure a UE such as the UE 115 to implement a split bearer configuration for UL transmission as shown in FIG. 2. FIG. 2 shows a UE 215 communicatively coupled to a network 250 via an LTE wireless communication link 204 and an NR wireless communication link 206. The UE 215 may correspond to a UE 115 of FIG. 1. The UE 215 includes an upper layer entity 210, a PDCP entity 220, and two radio interface protocol entities 230 and 240. The upper layer entity 210 may include a network stack such as TCP/IP. The radio interface protocol entities 230 and 240 provide two separate UL transmission paths to the network 250 (e.g., the BSs 105 and the core network). The UE 215 may include hardware and/or software components configured to implement the upper layer entity 210, the PDCP entity 220, and the radio interface protocol entities 230 and 240.

In the illustrated example of FIG. 2, the radio interface protocol entity 230 implements an LTE RAT and the radio interface protocol entity 240 implements an NR RAT. The LTE radio interface protocol entity 230 includes an LTE RLC entity 232, an LTE MAC entity 234, and an LTE PHY entity 236. The NR radio interface protocol entity 240 includes an NR RLC entity 242, an NR MAC entity 244, and an NR PHY entity 246. While FIG. 2 is described in the context of a radio bearer split between an LTE RAT and an NR RAT, a similar split radio bearer configuration can be applied to an NR-NR dual connectivity. In other words, the radio interface protocol entities 230 and 240 are NR radio interface protocol entities and the wireless communication links 204 and 206 are NR communication links. In some other instances, the split radio bearer can be configured between other suitable RATs.

The PDCP entity 220 may be an NR PDCP. The PDCP entity 220 may provide services to the upper layer entity 210, for example, including transfer of user plane data, header compression and decompression, ciphering and integrity protection, maintenance of PDCP sequence numbers, and in-sequence packet delivery. The PDCP entity 220 may receive acknowledged data transfer service (including indication of successful delivery of PDCP PDU) and/or unacknowledged data transfer services from the LTE RLC entity 232 and the NR RLC entity 242.

The LTE radio interface protocol entity 230 and the NR radio interface protocol entity 240 may operate independent of each other but may provide substantially similar services and/or functionalities. RLC entities 232 and 242 may perform packet concatenation, segmentation, re-segmentation, and reassembly, and/or ARQ. In some instances, the LTE RLC entity 232 may perform packet reordering, whereas the NR RLC entity 242 may not perform packet reordering since packet reordering is performed at the NR PDCP entity 220. In the transmitting path, the MAC entities 234 and 244 may perform mapping between logical channels and transport channels, multiplexing of MAC service data units (SDUs) from one or different logical channels onto transport blocks (TBs) to be delivered to corresponding entities 236 and 246 on transport channels, respectively, and/or HARQ retransmissions. In the receiving path, the MAC entities 234 and 244 may perform demultiplexing of MAC SDUs from one or different logical channels from TBs delivered from the corresponding PHY entities 236 and 246 on transport channels, respectively, scheduling information reporting, error correction through HARQ, and/or facilitate quality of service (QoS) handling. The PHY entities 236 and 246 carry data information to and from corresponding MAC entities 234 and 244, respectively. The PHY entities 236 and 246 may perform cell search, cell measurements, error coding, error decoding, modulation, demodulation, and/or physical channel scheduling and reporting.

In some aspects, the PDCP entity 220 receives data packets from the upper layer entity 210 and buffers the data packets in a UL PDCP queue 202 (e.g., at a buffer memory). Data can be buffered in a general memory, a specific memory, a dedicated memory array, or one or more areas in a memory storage. To aid in buffering, utilized memory storage may be designated for buffering though such designations are not necessary. Buffer memory may be a stand-alone memory storage and/or can be integrated into a general memory providing buffering. In some cases, buffering can be specific to PDCP PDUs where a buffer may only hold PDCP data.

As one example, a PDCP entity may add PDCP packet headers to data packets (e.g., upper layer packets) and perform sequence numbering to associate each data packet with a sequence number in an ascending order. The PDCP entity 220 may store the data packets along with the PDCP packet headers and associated sequence numbers at the UL PDCP queue 202. The data packets may be stored in a sequential order according to the sequence numbers. The data packets may be referred to as PDCP packets or PDCP PDUs. The PDCP entity 220 may route a portion of the packets to the radio interface protocol entity 230 and another portion of the packets to the radio interface protocol entity 240 for transmissions to the network 250. A PDCP packet being transmitted via the LTE radio interface protocol entity 230 may be processed by the LTE RLC entity 232, the LTE MAC entity 234, and the LTE PHY entity 236 prior to transmission over the wireless communication link 204 (e.g., a LTE link). Similarly, a PDCP packet being transmitted via the NR radio interface protocol entity 240 may be processed by the NR RLC entity 242, the NR MAC entity 244, and NR PHY entity 246 prior to transmission over the wireless communication link 206 (e.g., a NR link).

In some aspects, each of the LTE-RLC entity 232 and the NR-RLC entity 242 may have a buffer queue and may store transmitted packets along with a RLC sequence numbers in the RLC buffer queue. Since the LTE RLC entity 232 and the NR RLC entity 242 operate independently, each LTE RLC entity 232 and the NR-RLC entity 242 may maintain its own RLC packet sequence numbers and perform ARQ processing separately. Network 250 may transmit RLC acknowledgements (ACKs)/negative-acknowledgements (NACKs) to the UE 215 via a corresponding link using a corresponding RAT. For instance, for a packet transmitted via the LTE wireless communication link 204, the UE 215 may receive an ACK or a NACK via the LTE wireless communication link 204. Alternatively, for a packet transmitted via the NR wireless communication link 206, the UE 215 may receive an ACK or a NACK via the NR wireless communication link 206. For each received ACK at the LTE RLC entity 232, the LTE RLC entity 232 may report the ACK to the PDCP entity 220. Upon receiving a NACK, the LTE RLC entity 232 may retransmit a corresponding packet to the network 250. Similarly, for each received ACK or NACK at the NR RLC entity 242, the NR RLC entity 242 may report the ACK or NACK to the PDCP entity 220. Upon receiving a NACK, the NR RLC entity 242 may retransmit a corresponding packet to the network 250. The PDCP entity 220 holds a range of the data packets in the UL PDCP queue 202 starting from a lowest sequence numbered packet with an unconfirmed delivery. In other words, the PDCP entity 220 may store all transmitted packets beginning from a lowest sequence numbered unacknowledged packet.

Figure 3A:
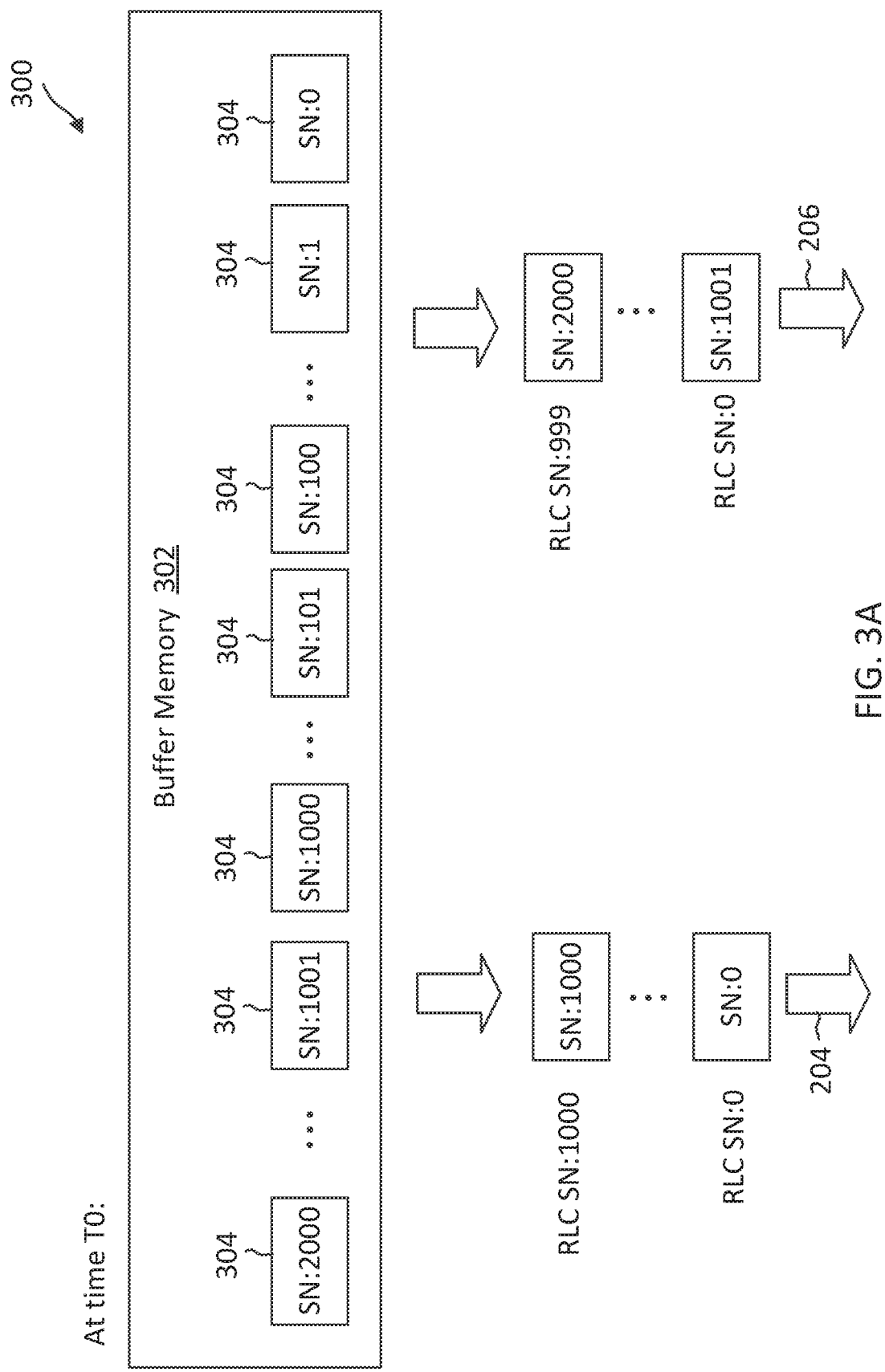
FIG. 3A illustrates an exemplary buffer memory according to some aspects of the present disclosure.
Figure 3B:
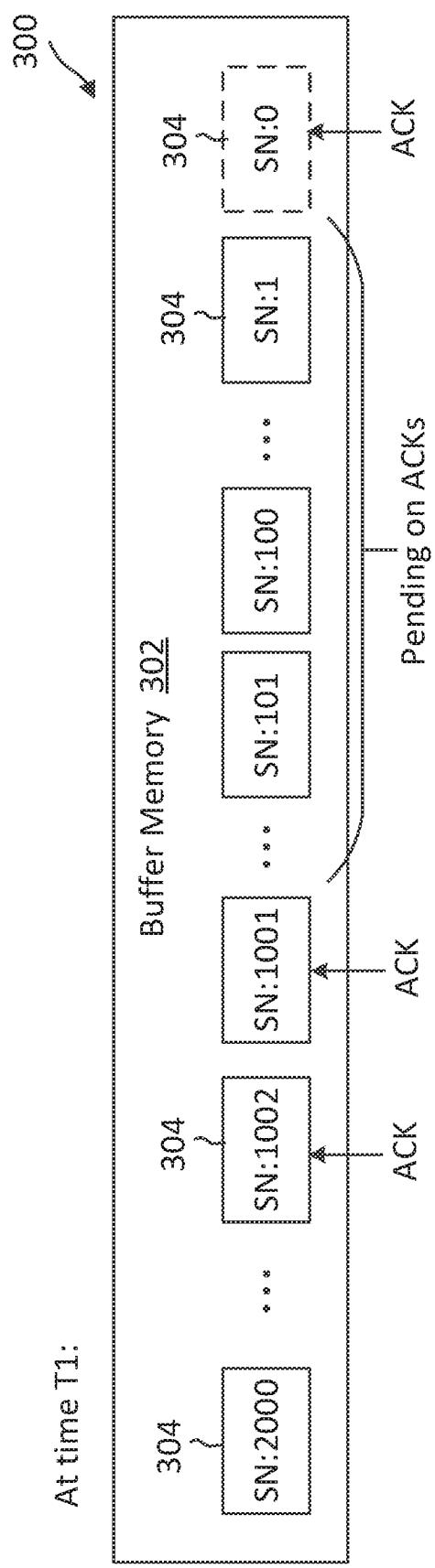
FIG. 3B illustrates an exemplary buffer memory according to some aspects of the present disclosure.
Figure 3C:
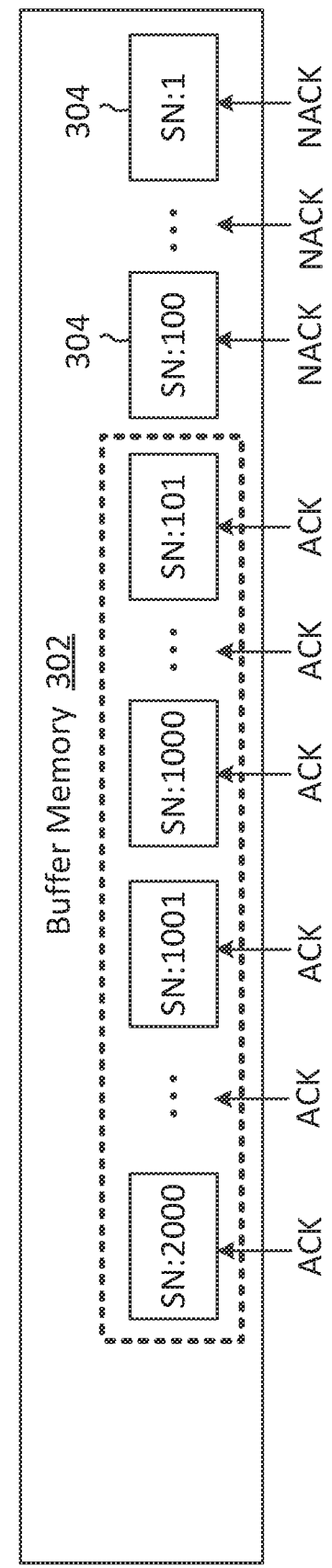
FIG. 3C illustrates an exemplary buffer memory according to some aspects of the present disclosure.

FIGS. 3A-3C are discussed in relation to FIG. 2 to illustrate a packet buffering scenario 300 at the UE 215. FIG. 3A illustrates an exemplary packet buffer memory 302 according to some aspects of the present disclosure. The buffer memory 302 may be a memory at the UE 215 and configured to store the UL PDCP queue 202. Additionally or alternatively, buffer memory 302 can be a stand-alone memory storage or integrated as part of a general memory storage for a device, such as a UE or BS. In some instances, having a stand-alone buffer memory may be desired and/or in some instances, an integrated memory storage can be used for buffering data (e.g., PDCP data).

In the illustrated example of FIG. 3A, at time T0, the PDCP entity 220 is configured to split data packets received from the upper layer entity 210 into two portions for transmission to the network 250 via separate wireless communication links 204 and 206. For instance, the PDCP entity 220 routes a portion of the PDCP packets 304 with sequence number (SN) 0 to SN 1000 to the LTE RLC entity 232 for transmission over the LTE wireless communication link 204 to the network 250 and routes another portion of the PDCP packets 304 with SN 1001 to 2000 to the NR RLC entity 242 for transmission over the LTE wireless communication link 206 to the network 250. The PDCP entity 220 buffers the PDCP packets 304 at the buffer memory 302, for example, in a sequential order.

For simplicity of illustration and discussion, RLC packets may have a one-to-one mapping with PDCP packets. The LTE RLC entity 232 receives PDCP packets 304 SN 0 to SN 1000 and associates each PDCP packets 304 with an RLC sequence number. For instance, the PDCP packet 304 SN 0 is associated with RLC SN 0, PDCP packet 304 SN 1 is associated with RLC SN 1, and so on. The RLC entity 232 transmits the RLC packets with RLC SN 0 to SN 1000 carrying PDCP packets with SN 0 to SN 1000. Similarly, the NR RLC entity 242 receives PDCP packets 304 SN 1001 to SN 2000 and associates each PDCP packets 304 with an RLC sequence number. For instance, the PDCP packet 304 SN 1001 is associated with RLC SN 0, PDCP packet 304 SN 1002 is associated with RLC SN 1, and so on. The NR RLC entity 242 transmits RLC packets with RLC SN 0 to SN 1999 carrying PDCP packets with SN 1001 to SN 2000.

In some aspects, the LTE PHY entity 236 may use different transmission time intervals (TTIs) and/or UL scheduling timeline than the NR PHY entity 246 for OTA transmissions. For instance, the LTE PHY entity 236 may use a TTI of about 1 millisecond (ms) while the NR PHY entity 246 may use a TTI of about 0.125 ms. Additionally, the LTE PHY entity 236 may have a UL grant scheduling delay of about 3 TTIs (e.g., about 3 ms) while the NR PHY entity 246 may schedule a UL grant in the same slot (e.g., <0.125 ms). Accordingly, the LTE wireless communication link 204 and the NR wireless communication link 206 may have different throughputs and/or different retransmission timeline. Additionally, the LTE wireless communication link 204 and the NR wireless communication link 206 may have different channel conditions (e.g., different signal-to-noise ratios (SNRs) and/or different block error rates (BLERs)). For instance, the LTE wireless communication link 204 may have a lower throughput, a lower SNR, and/or a lower BLER than the NR wireless communication link 206. As discussed above, PDCP may not free an acknowledged packet from the memory until all lower sequence numbered packets are acknowledged. Accordingly, the PDCP entity 220 may continue to hold a PDCP packet 304 at the buffer memory 302 while the PDCP packet 304 is pending on ACKs from the network 250 or a lower sequence numbered packet 304 is pending on an ACK. The different throughputs and/or channel conditions over the LTE wireless communication link 204 and the NR wireless communication link 206 may have an impact on the amount of memory required at the buffer memory 302 (shown in FIGS. 3B and 3C) when operating in a dual connectivity mode with LTE and NR.

FIG. 3B illustrates the exemplary buffer memory 302, for example, at time T1, according to some aspects of the present disclosure. As shown, the LTE RLC entity 232 receives an ACK for the RLC packet SN 0 (corresponding to PDCP SN 0). The LTE RLC entity 232 may report the ACK for the PDCP packet 304 SN 0 to the PDCP entity 220. The NR RLC entity 242 also receives ACKs for the RLC packets SN 0 and SN 1 (corresponding to PDCP SN 1001 and 1002). The NR RLC entity 242 may report the ACKs for the PDCP packets 304 SN 1001 and SN 1002 to the PDCP entity 220. The PDCP entity 220 may release or free the PDCP packet 304 SN 0 from the buffer memory 302 since the PDCP packet 304 SN 0 is acknowledged and there is no unacknowledged packet with a lower sequence number at the buffer memory 302. The released PDCP packet 304 SN 0 is shown by the dashed box. However, the PDCP entity 220 may not release the acknowledged PDCP packets 304 SN 1001 and SN 1002 since there are packets with sequence numbers lower than SN 1001 pending on ACKs from the network 250. In other words, the PDCP entity 220 may continue to hold the acknowledged PDCP packets 304 SN 1001 and 1002 at the buffer memory 302 while the lower sequence numbered packets 304 SN 1 to SN 1000 are pending on ACKs.

FIG. 3C illustrates the exemplary buffer memory 302, for example, at time T2, according to some aspects of the present disclosure. As shown, the packet 304 SN 0 is released from the buffer memory 302. The LTE RLC entity 232 further receives NACKs for RLC packets SN 1 to SN 100 (corresponding to PDCP SN 1 to SN 100) and receives ACKs for RLC packets SN 101 to SN 1000 (corresponding to PDCP SN 101 to 1000) while the NR RLC entity 242 further receives ACKs for all RLC packets SN 2 to SN 999 (corresponding to PDCP SN 1003 to 2000). Since PDCP packets 304 SN 1 to SN 100 were not delivered successfully to the network 250, the PDCP entity 220 continues to hold the PDCP packets SN 1 to SN 2000 at the buffer memory 302 even though PDCP packets SN 101 to SN 2000 are successfully delivered to the network 250. In other words, until the LTE RLC entity 232 receives ACKs for the lower sequence numbered PDCP packets 304 SN 1 to PDCP SN 100, the PDCP entity 220 may not release the PDCP packets 304 SN 101 to 2000 (shown by the dotted box) from the buffer memory 302.

While the LTE RLC entity 232 and/or the NR RLC entity 242 may retransmit packets that are not acknowledged by the network 250, the PDCP entity 220 may continue to receive new packets. These packets may be received from the upper layer entity 210. The PDCP entity 220 may continue to route new packets for transmission over the NR wireless communication link 206 and/or the LTE wireless communication link 204. Thus, there may be a large number of new packets being transmitted over the faster NR wireless communication link 206 before LTE recovers the packets (e.g., retransmissions) on the slower LTE wireless communication link 204, causing the number of packets held at the buffer memory 302 to increase and eventually the buffer memory 302 may be full. When the buffer memory 302 is full (or reaches a threshold of interest (e.g., 90% capacity)), the UE 215 may drop new packets coming in from the upper layer entity 210. This packet overflow or out-of-memory issue is caused by the different transmission throughputs and/or different channel SNRs over the LTE wireless communication link 204 and the NR wireless communication link 206.

Accordingly, the present application provides techniques for a device (UE and/or BS) to control the amount of data being routed through a first wireless communication link (e.g., the LTE wireless communication link 204) and the amount of data being routed through a second link (e.g., the NR wireless communication link 206) in a UL split bearer configuration such that the UE may maintain a certain occupancy at the PDCP buffer memory to avoid memory overflow while providing an optimal UL transmission performance over the first and second wireless communication links. When a buffer memory occupancy threshold is satisfied (e.g., reaches a certain level, packet amount, an occupancy level, a remaining capacity level, etc.), a device can implement various actions in a multi-link communication scenario. For example, a device's PDCP entity can modify or stop packet routing to an RLC entity.

Figure 4:
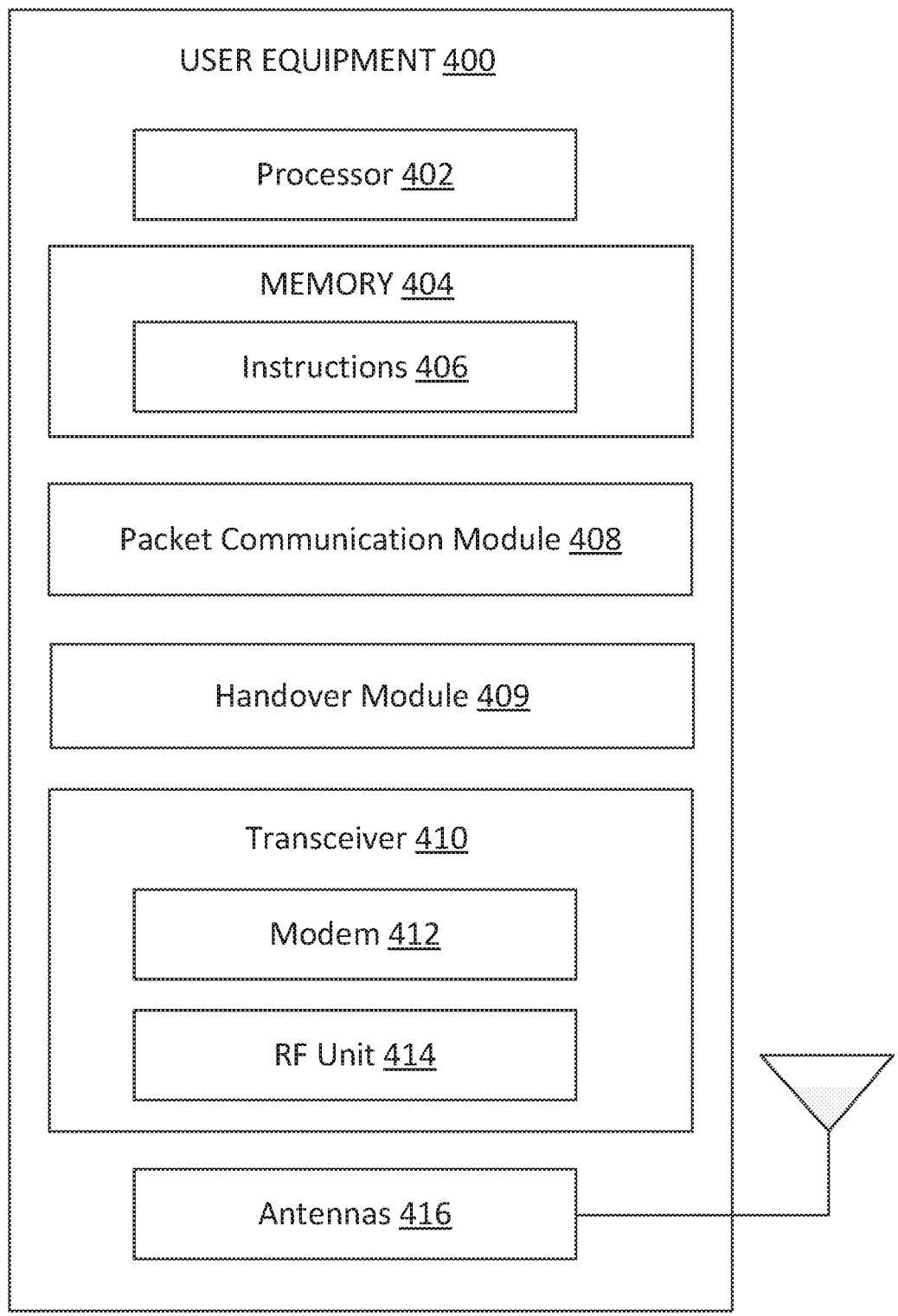
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or a UE 215 discussed above in FIG. 2. As shown, the UE 400 may include a processor 402, a memory 404, a packet communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2-3 and 6-11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the packet communication module 408 and the handover module 409 may be implemented via hardware, software, or combinations thereof. For example, each of the packet communication module 408 and the handover module 409 may be implemented as a processor, circuit, and/or instructions 406 stored in the memory 404 and executed by the processor 402. In some examples, the packet communication module 408 and the handover module 409 can be integrated within the modem subsystem 412. For example, the packet communication module 408 and the handover module 409 can be implemented by a combination of software components (e.g., executed by a DSP or a general processor) and hardware components (e.g., logic gates and circuitry) within the modem subsystem 412. In some examples, a UE may include one or more of the packet communication module 408 and the handover module 409. In other examples, a UE may include both the packet communication module 408 and the handover module 409.

The packet communication module 408 and the handover module 409 may be used for various aspects of the present disclosure, for example, aspects of aspects of FIGS. 2-3 and 6-11. The packet communication module 408 is configured to establish a split radio bearer configuration (e.g., a UL split radio bearer configuration) with a network (e.g., the networks 100 and/or 200), receive a plurality of data packets from an upper layer (e.g., application layer), perform packet sequence numbering to associate each data packet with a sequence number, transmit a first portion of the plurality of data packets to the network via a first wireless communication link using a first RAT (e.g., LTE) and a second portion (e.g., a remaining portion) of the plurality of data packets to the network via a second wireless communication link using a second RAT (e.g., NR), buffering the plurality of packets in a buffer memory (corresponding to a portion of the memory 404) while at least a first data packet of the plurality of data packets is pending on an ACK, detect a threshold occupancy of the buffer memory is satisfied, and take various actions to control the buffer memory, for example, by determining a transmission configuration for the first data packet or a second data packet (e.g., a new data packet different from the plurality of data packets) in response to the detection.

In some aspects, packet communication module 408 is configured to determine that the threshold occupancy of the buffer memory is satisfied based on an amount of the plurality of data packets stored at the buffer memory satisfies the threshold occupancy of the buffer memory. In some aspects, the packet communication module 408 is configured to determine that the threshold occupancy of the buffer memory is satisfied based on an amount of unacknowledged data packets of the plurality of data packets stored at the buffer memory satisfies the threshold occupancy of the buffer memory. In some aspects, the packet communication module 408 is configured to determine that the threshold occupancy of the buffer memory is satisfied based on a difference between a PDCP sequence number in the first portion and a PDCP sequence number in the second portion satisfies the threshold occupancy of the buffer memory.

In some aspects, the transmission configuration expedites a retransmission of first data packet and delay a transmission of the second data packet. The packet communication module 408 is configured to perform an unsolicited retransmission at an RLC level over at least one of the first wireless communication link or the second wireless communication link, perform an unsolicited retransmission at a PDCP level, perform a transmission of an RLC status poll request, simulate a link degradation over the first or second wireless communication link that is ahead of the other first or second wireless communication link (in terms of PDCP sequence numbers) due a higher throughput and/or a higher SNR.

In some aspects, packet communication module 408 is configured to determine to split the plurality of data packets into the first portion and the second portion based on a throughput ratio between the first wireless communication link and the second wireless communication link.

The handover module 409 is configured to perform channel measurements of a serving cell (e.g., the serving BS), receive a neighboring cell measurement report trigger from the serving BS, transmit channel measurement reports of the serving cell and/or the neighboring cells to the BS, determine whether there is a potential upcoming handover, for example, based on the channel measurements and/or the reception of the neighboring cell measurement report trigger. The handover module 409 is configured to instruct the packet communication module 409 to buffer the plurality of packets at the buffer memory when determining that a potential handover is upcoming and instruct the packet communication module 409 to skip buffering the plurality of packets at the buffer memory when determining that there is no potential handover upcoming. Mechanisms for managing buffer memory for a split radio bearer configuration are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the packet communication module 408 and/or the handover module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, ACK/NACKs, RLC status poll) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., a split radio bearer configuration, PDCCH, PDSCH, ACK/NACKs, RLC status poll, neighboring cell measurement report trigger, and/or handover instruction) to the packet communication module 408 and/or the handover module 409 for processing. The antennas 416 may include multiple antennas of similar or different designs in order to sustain multiple transmission links. The RF unit 414 may configure the antennas 416.

In an example, the transceiver 410 is configured to transmit a first portion of a plurality of data packets using a first RAT (e.g., LTE) and transmit a second portion of the plurality of data packets using a second RAT different from the first RAT, where the plurality of data packets have a defined order, for example, by coordinating with the packet communication module 408. The memory 404 is configured with a buffer memory for storing the plurality of data packets while at least a first data packet of the plurality of data packets is pending on an ACK, for example, by coordinating with the packet communication module 408. The processor 402 is configured to determine a transmission configuration for at least the first data packet and a second data packet based on a detection that the plurality of data packets satisfies a threshold occupancy of the buffer memory, for example, by coordinating with the packet communication module 408.

In an example, the transceiver 410 is configured to transmit a first portion of a plurality of data packets using a first RAT (e.g., LTE) and transmit a second portion of the plurality of data packets using a second RAT different from the first RAT, where the plurality of data packets have a defined order, for example, by coordinating with the packet communication module 408. The processor 402 is configured to detect an upcoming handover, store the plurality of data packets at a buffer memory configured at the memory 404 while at least a first data packet of the plurality of data packets is pending on an ACK in response to the detection, and determine a transmission configuration for the first data packet and a second data packet (e.g., a new packet different from the plurality of data packets) based on a detection that the plurality of data packets satisfy a threshold occupancy of the buffer memory, for example, by coordinating with the packet communication module 408 and the handover module 409.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
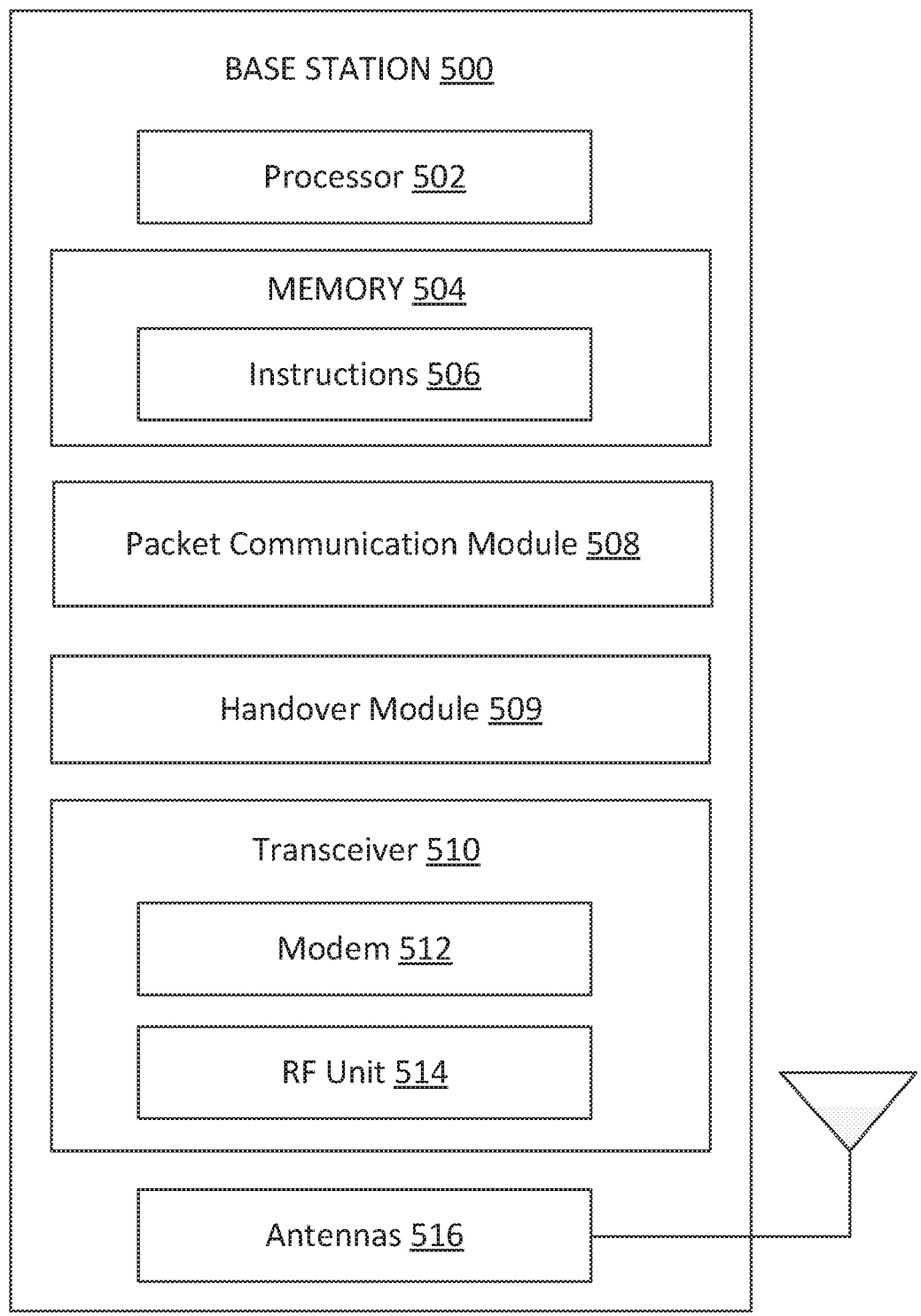
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a packet communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-10. Instructions 506 may also be referred to as code, which may be interpreted broadly to include any type of computer-readable statement(s) as discussed above with respect to FIG. 4.

Each of the packet communication module 508 and the handover module 509 may be implemented via hardware, software, or combinations thereof. For example, each of the packet communication module 508 and the handover module 509 may be implemented as a processor, circuit, and/or instructions 506 stored in the memory 504 and executed by the processor 502. In some examples, the packet communication module 508 and the handover module 509 can be integrated within the modem subsystem 512. For example, the packet communication module 508 and the handover module 509 can be implemented by a combination of software components (e.g., executed by a DSP or a general processor) and hardware components (e.g., logic gates and circuitry) within the modem subsystem 512. In some examples, a BS may include one or more of the packet communication module 508 and the handover module 509. In other examples, a BS may include both the packet communication module 508 and the handover module 509.

The packet communication module 508 and the handover module 509 may be used for various aspects of the present disclosure, for example, aspects of aspects of FIGS. 2-3 and 6-10. The packet communication module 508 is configured to establish a split radio bearer configuration (e.g., a DL split radio bearer configuration) with a UE (e.g., the UEs 115, 215, and/or 400), receive a plurality of data packets from an upper layer (e.g., application layer), perform packet sequence numbering to associate each data packet with a sequence number, transmit a first portion of the plurality of data packets to the network via a first wireless communication link using a first RAT (e.g., LTE) and a second portion (e.g., a remaining portion) of the plurality of data packets to the network via a second wireless communication link using a second RAT (e.g., NR), buffering the plurality of packets in a buffer memory (corresponding to a portion of the memory 404) while at least a first data packet of the plurality of data packets is pending on an ACK, detect a threshold occupancy of the buffer memory is satisfied, and take various actions to control the buffer memory, for example, by determining a transmission configuration for the first data packet or a second data packet (e.g., a new data packet different from the plurality of data packets) in response to the detection.

In some aspects, packet communication module 508 is configured to determine that the threshold occupancy of the buffer memory is satisfied based on an amount of the plurality of data packets stored at the buffer memory satisfies the threshold occupancy of the buffer memory. In some aspects, the packet communication module 508 is configured to determine that the threshold occupancy of the buffer memory is satisfied based on an amount of unacknowledged data packets of the plurality of data packets stored at the buffer memory satisfies the threshold occupancy of the buffer memory. In some aspects, the packet communication module 508 is configured to determine that the threshold occupancy of the buffer memory is satisfied based on a difference between a PDCP sequence number in the first portion and a PDCP sequence number in the second portion satisfies the threshold occupancy of the buffer memory.

In some aspects, the transmission configuration expedites a retransmission of first data packet and delay a transmission of the second data packet. The packet communication module 508 is configured to perform an unsolicited retransmission at an RLC level over at least one of the first wireless communication link or the second wireless communication link, perform an unsolicited retransmission at a PDCP level, perform a transmission of an RLC status poll request, simulate a link degradation over the first or second wireless communication link that is ahead of the other first or second wireless communication link (in terms of PDCP sequence numbers) due a higher throughput and/or a higher SNR.

In some aspects, packet communication module 508 is configured to determine to split the plurality of data packets into the first portion and the second portion based on a throughput ratio between the first wireless communication link and the second wireless communication link.

In some aspects, the handover module 509 is configured to determine channel measurements over the first wireless communication link and/or the second wireless communication link, transmit a neighboring cell measurement report trigger to the UE, receive channel measurement reports form the UE, determine whether to perform a handover of the UE to a target cell based on the determined measurements and/or received measurement reports, select a target cell or target BS for the UE, and instruct the UE to perform a handover to the target cell based on the determined channel measurements and/or received channel measurement reports. Mechanisms for managing buffer memory for a split radio bearer configuration are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., a split radio bearer configuration, PDCCH, PDSCH, ACK/NACKs, RLC status poll, a handover instruction, a neighboring cell measurement report trigger) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510.

The transceiver 510 may provide the demodulated and decoded data (e.g., PUCCH, PUSCH, ACK/NACKs, RLC status poll) to the packet communication module 508 and the handover module 509 for processing. The antennas 516 may include multiple antennas of similar or different designs to sustain multiple transmission links.

In an example, the transceiver 510 is configured to transmit a first portion of a plurality of data packets using a first RAT (e.g., LTE) and transmit a second portion of the plurality of data packets using a second RAT different from the first RAT, where the plurality of data packets have a defined order, for example, by coordinating with the packet communication module 508. The memory 504 is configured with a buffer memory for storing the plurality of data packets while at least a first data packet of the plurality of data packets is pending on an ACK, for example, by coordinating with the packet communication module 508. The processor 502 is configured to determine a transmission configuration for the first data packet and a second data packet based on a detection that the plurality of data packets satisfies a threshold occupancy of the buffer memory, for example, by coordinating with the packet communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

As discussed above with references to FIGS. 3A-3C, due to variations in throughputs, transmission timeline, and/or retransmission timeline between the first RAT and second RAT, the buffer memory 302 can build up and impact the throughput performance when utilizing a split bearer configuration with the first RAT and second RAT. FIGS. 6-10 illustrate various mechanisms for managing buffer memory when utilizing a split radio bearer such that a minimal amount of memory may be used to maintain an optimal throughput performance.

Figure 6:
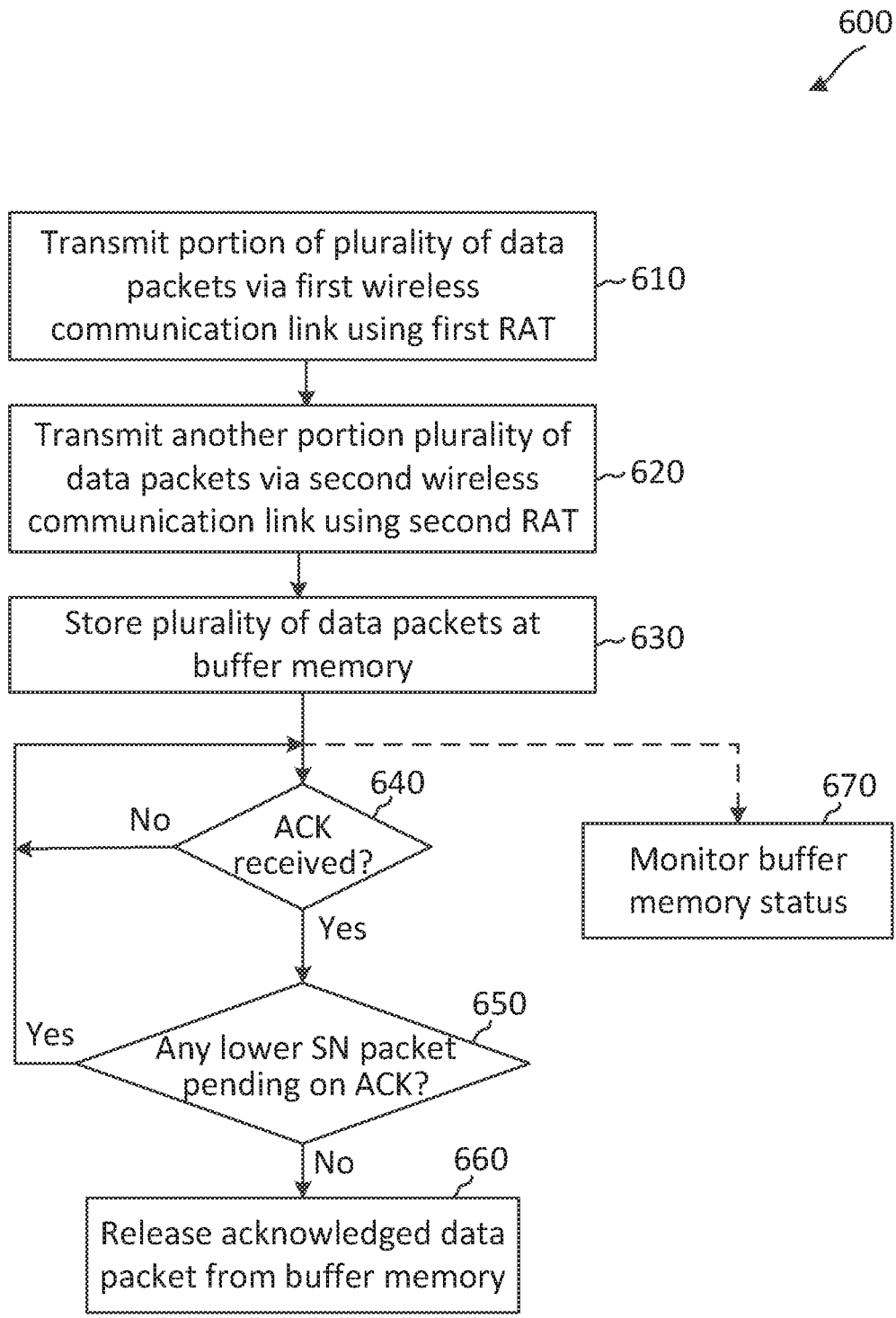
FIG. 6 is a flow diagram of a packet communication method according to some aspects of the present disclosure.

FIG. 6 is a flow diagram of a packet communication method 600 according to some aspects of the present disclosure. Aspects of the method 600 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the transceiver 410, the modem 412, and the one or more antennas 416, to execute the steps of method 600 when implementing a UL split bearer configuration. Alternatively, a wireless communication device, such as the BS 105 or 500, may utilize one or more components, such as the processor 502, the memory 504, the packet communication module 508, the transceiver 510, the modem 512, and the one or more antennas 516, to execute the steps of method 600 when implementing a DL split bearer configuration. As illustrated, the method 600 includes a number of enumerated steps, but aspects of the method 600 may include additional steps before, after, and in between the enumerated steps. In some aspects, one or more of the enumerated steps may be omitted or performed in a different order.

In the method 600, the wireless communication device is configured with a split radio bearer configuration. This configuration may be similar to the split radio bearer configuration discussed above with reference to FIG. 2, where a PDCP entity (e.g., the PDCP entity 220) at the wireless communication device is split into two radio interface protocol interfaces for OTA transmissions (e.g., via an LTE link and an NR link).

At block 610, the wireless communication device transmits a portion of a plurality of data packets (e.g., the PDCP data packets 304) via a first wireless communication link (e.g., the wireless communication link 204) using a first RAT (e.g., LTE). For instance, the wireless communication device may utilize one or more components, such as the processor 402 and 502, the packet communication module 408 and 508, the transceiver 410 and 510, the modem 412 and 512, and the one or more antennas 416 and 516, to transmits the portion of the plurality of data packets via the first wireless communication link using the first RAT.

At block 620, the wireless communication device transmits another portion of a plurality of data packets via a second wireless communication link using a second RAT (e.g., NR). For instance, the wireless communication device may utilize one or more components, such as the processor 402 and 502, the packet communication module 408 and 508, the transceiver 410 and 510, the modem 412 and 512, and the one or more antennas 416 and 516, to transmits the another portion of the plurality of data packets via the second wireless communication link using the second RAT.

At block 630, the wireless communication device stores the plurality of data packets at a buffer memory (e.g., the buffer memory 302, the memory 404 and/or 504). For instance, for each packet ready for transmission, the wireless communication device routes the packet a transmission queue and also saves a copy the packet at the buffer memory for a potential retransmission, for example, during a PDCP re-establishment.

At block 640, the wireless communication device determines whether an ACK is received for any of the plurality of transmitted packets stored at buffer memory. For instance, the wireless communication device may utilize one or more components, such as the processor 402 and 502, the packet communication module 408 and 508, the transceiver 410 and 510, the modem 412 and 512, and the one or more antennas 416 and 516, to determine whether the ACK is received. If the wireless communication device determines that no ACK is received, the wireless communication device repeats the block 640 to wait for ACKs. Additionally, the wireless communication device performs the block 670 in parallel with ACK monitoring.

Figure 7:
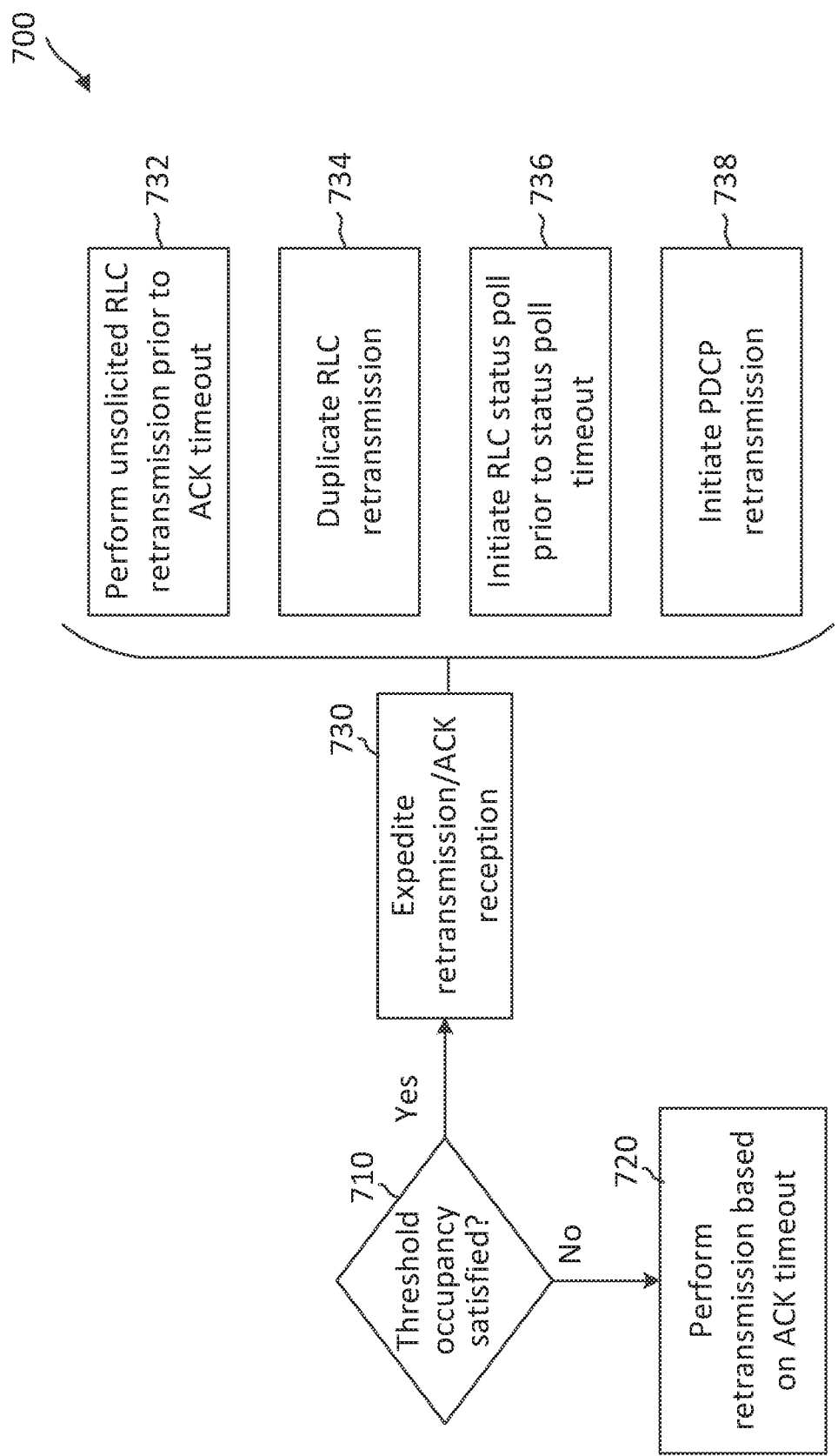
FIG. 7 is a flow diagram of a packet communication method according to some aspects of the present disclosure.
Figure 8:
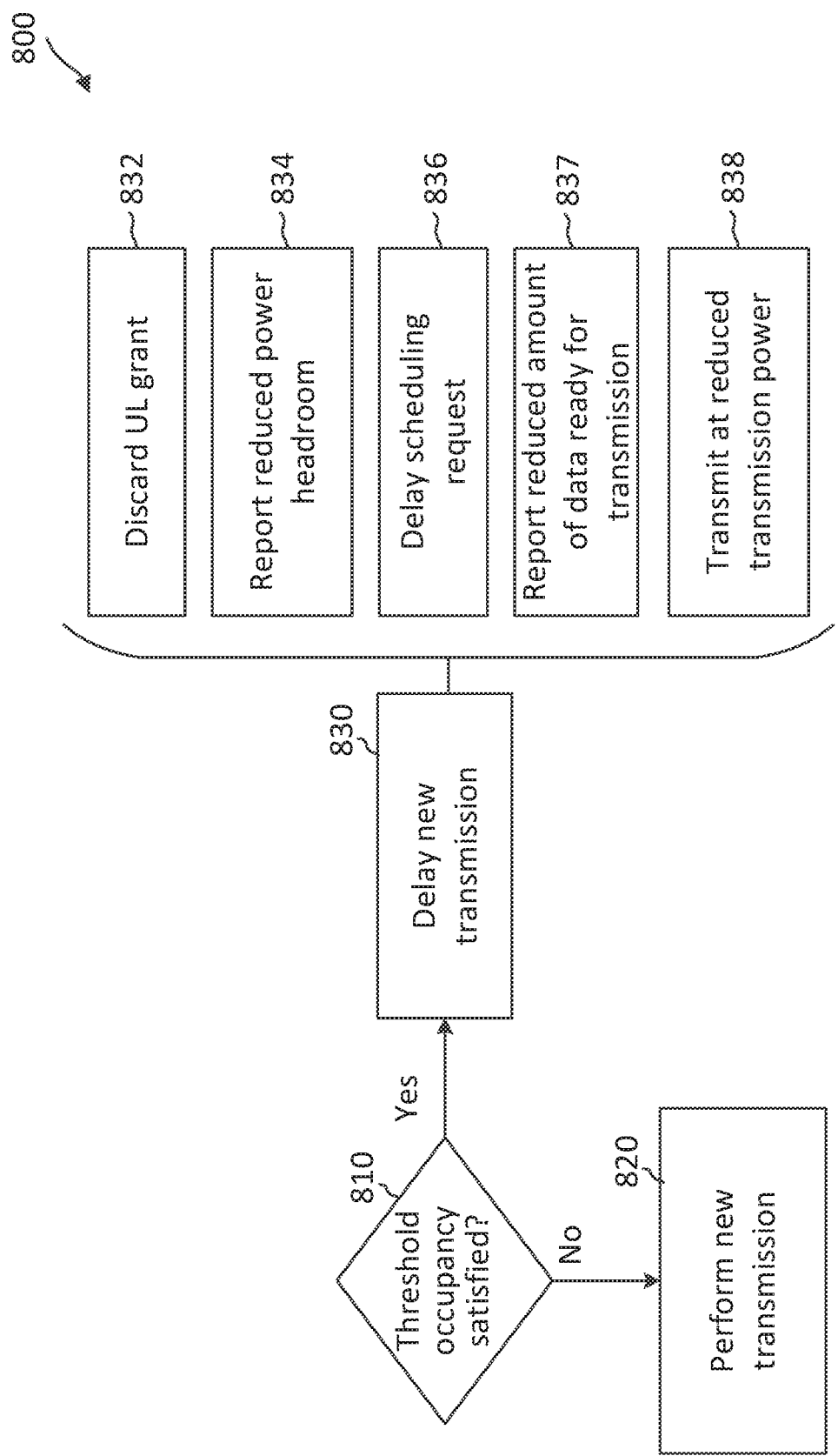
FIG. 8 is a flow diagram of a packet communication method according to some aspects of the present disclosure.

At block 670, the wireless communication device monitors the buffer memory status, for example, to determine whether a certain threshold occupancy buffer is met and whether certain actions are to be taken, such as expediting a retransmission, delaying a new transmission, and/or polling for a reception status, as described in greater detail in FIGS. 7-8.

Returning to the block 640, if the wireless communication device determines that an ACK is received for a packet stored at the buffer memory, the wireless communication device proceeds to the block 650. At block 650, the wireless communication device determines whether there is any lower sequence numbered packet stored in the buffer memory that are pending on ACK. For instance, the wireless communication device may utilize one or more components, such as the processor 402 and 502, the packet communication module 408 and 508, the transceiver 410 and 510, the modem 412 and 512, and the one or more antennas 416 and 516, to determine whether there is any lower sequence numbered packet stored in the buffer memory that are pending on ACK. If the wireless communication device determines that there is at least one lower sequence numbered packet stored at the buffer memory pending on ACK, the wireless communication device returns to block 640 to monitor for ACK. Otherwise, the wireless communication device proceeds to the block 660.

At block 660, the wireless communication device releases the acknowledged data packet from the buffer memory. For instance, the wireless communication device may utilize one or more components, such as the processor 402 and 502, the packet communication module 408 and 508, to releases the acknowledged data packet from the buffer memory.

In some aspects, the method 600 is implemented at a PDCP entity (e.g., PDCP entity) of the wireless communication device. As shown, the method 600 buffers packets that are transmitted, for example, to a RLC entity (e.g., the RLC entity 232 and 242) at the buffer memory and may release an acknowledged packet from the buffer memory if there is no other lower sequence numbered packet in the buffer memory that is pending on ACK.

FIG. 7 is a flow diagram of a packet communication method 700 according to some aspects of the present disclosure. The method 700 may be implemented in conjunction with the method 600. For instance, the block 670 of FIG. 6 may implement the method 700 to monitor the buffer memory status. Aspects of the method 700 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the transceiver 410, the modem 412, and the one or more antennas 416, to execute the steps of method 700 when implementing a UL split bearer configuration. Alternatively, a wireless communication device, such as the BS 105 or 500, may utilize one or more components, such as the processor 502, the memory 504, the packet communication module 508, the transceiver 510, the modem 512, and the one or more antennas 516, to execute the steps of method 700 when implementing a DL split bearer configuration. As illustrated, the method 700 includes a number of enumerated actions and/or steps, and aspects of the method 700 may include additional steps before, after, and in between the enumerated steps. In some aspects, one or more of the enumerated steps may be omitted or performed in a different order.

At block 710, the wireless communication device determines whether a threshold occupancy of the buffer memory is satisfied. For instance, the wireless communication device may utilize one or more components, such as the processor 402 and 502, the packet communication module 408 and 508, to determine whether the threshold occupancy of the buffer memory is satisfied. If the wireless communication device determines that the threshold occupancy of the buffer memory is satisfied, the wireless communication device proceeds to block 730.

At block 730, the wireless communication device expedites retransmission and/or ACKs of packets at the buffer memory that are pending on ACKs. For instance, the wireless communication device may utilize one or more components, such as the processor 402 and 502, the packet communication module 408 and 508, the transceiver 410 and 510, the modem 412 and 512, and the one or more antennas 416 and 516, to expedite the retransmission.

In some aspects, the wireless communication device is configured to manage utilization of the buffer memory by controlling the total amount of data packets that are transmitted OTA (via the first wireless communication link and the second wireless communication link) and pending on RLC level ACKs at a given time. The wireless communication device may expedite retransmission when the total amount data packets transmitted OTA and pending on RLC level ACKs is greater than a certain threshold M. Accordingly, at the block 710, the wireless communication device may utilize one or more components, such as the processor 402 and 502, the packet communication module 408 and 508, to detect whether an amount the plurality of transmitted data packets stored at the buffer memory satisfies the threshold occupancy of the buffer memory. The amount may be in unit of number of data bytes, number of data packets, or a percentage of the buffer memory. In some aspects, the wireless communication device may additionally stop new packet transmission at the PDCP level (e.g., the PDCP entity) upon detecting that the threshold occupancy of the buffer memory is satisfied (or reaches a level of interest, ranging from nearly empty, half empty/full, to nearly full). In other words, the PDCP entity may stop routing new packets to the LTE RLC entity or the NR RLC entity.

In some aspects, the wireless communication device is configured to manage utilization of the buffer memory by controlling the amount of data to be acknowledged across the first wireless communication link and the second wireless communication link. The wireless communication device may expedite retransmission when the amount of data to be acknowledged across the first wireless communication link and the second wireless communication link is greater than a certain threshold M. Accordingly, at the block 710, the wireless communication device may utilize one or more components, such as the processor 402 and 502, the packet communication module 408 and 508, to detect whether an amount of unacknowledged data packets of the plurality of data packets stored at the buffer memory satisfies the threshold occupancy of the buffer memory. The amount may be in unit of number of data bytes, number of data packets, or a percentage of the buffer memory.

In some aspects, the wireless communication device is configured to manage utilization of the buffer memory by controlling a difference or skew between amounts of packets that are transmitted over the first wireless communication link and amounts of packets that are transmitted over the second wireless communication link, for example, due to different throughputs and/or channel condition between the first and second wireless communication links. For instance, the first wireless communication link has a lower throughput or a poorer channel condition (e.g., lower SNR) than the second wireless communication link. As discussed above, the PDCP entity may associated each packet for transmission with a sequence number, for example, in an ascending order. To control the amount of packets at the buffer memory pending on ACKs, the PDCP entity may ensure that a lowest sequence numbered packet (e.g., with a first PDCP sequence number) transmitted over the first wireless communication link pending on ACK and a lowest sequence numbered packet (e.g., with a second PDCP sequence number) transmitted over the first wireless communication link with an acknowledgement is within a certain range (e.g., a threshold M). The wireless communication device may expedite retransmission when a difference between the first PDCP sequence number and the second PDCP sequence number satisfies the threshold M. Accordingly, at the block 710, the wireless communication device may utilize one or more components, such as the processor 402 and 502, the packet communication module 408 and 508, to identify a first sequence number of a lowest sequence numbered packet transmitted over the first wireless communication link pending on ACK, identify a second sequence number of a lowest sequence numbered packet transmitted over the second wireless communication link with an acknowledgement, and determine whether a difference between the first sequence number and the second sequence number satisfies the threshold occupancy of the buffer memory.

The wireless communication device may expedite the retransmission by performing various operations at the RLC level or at the PDCP level as shown in the blocks 732, 734, 736, and/or 738. In some aspects, the wireless communication device may expedite the retransmission by performing an unsolicited RLC retransmission prior to an ACK timeout as shown at the block 732. An RLC entity (e.g., the RLC entity 232) at the wireless communication device may transmit a packet received from the PDCP entity and may wait for an ACK for the packet. If the RLC entity does not receive an ACK for the packet with a certain time period (e.g., an ACK timeout period) or received a NACK, the RLC entity may retransmit the packet. To expedite the retransmission, the RLC entity may retransmit the unconfirmed or unacknowledged packet without waiting for the time period to elapsed or receiving a NACK so that an ACK may be received from the peer or receiving device at an earlier time. For instance, the wireless communication device may utilize one or more components, such as the processor 402 and 502, the packet communication module 408 and 508, the transceiver 410 and 510, the modem 412 and 512, and the one or more antennas 416 and 516, to retransmit the unacknowledged packet via the first wireless communication link using the first RAT, the second wireless communication link using the second RAT, or a combination thereof. In some aspects, the retransmission may include a different version of the initially transmitted RLC PDU (e.g., the unacknowledged packet). For instance, the retransmission may include small-size payload, for example, including 1 byte of the RLC PDU payload. The smaller sized PDU can allow the receiving RLC entity to successfully receive the PDU at an earlier time and acknowledge the PDU at an earlier time, and thus the wireless communication device may release or free the PDU from buffer memory earlier.

In some aspects, the wireless communication device may expedite the retransmission by duplicating an RLC retransmission as shown at the block 734. A first RLC entity (e.g., the LTE RLC entity 232) associated with the first wireless communication link and an RLC entity (e.g., the NR RLC entity 242) associated with the second wireless communication link both retransmit a packet that was transmitted via the first wireless communication link and pending on an ACK. The duplication may enable the peer receiving device to receive the packet successfully at an earlier time and ACK the packet at an earlier time so that the packet may be released from the buffer memory at any earlier time. For instance, the wireless communication device may utilize one or more components, such as the processor 402 and 502, the packet communication module 408 and 508, the transceiver 410 and 510, the modem 412 and 512, and the one or more antennas 416 and 516, to retransmit the unacknowledged packet via the first wireless communication link using the first RAT and the second wireless communication link using the second RAT.

In some aspects, the wireless communication device may expedite the ACK reception by initiating a RLC status poll prior to a status poll trigger as shown at the block 736. An RLC entity (e.g., the RLC entity 232) at the wireless communication device may transmit a reception status poll request (e.g., by setting a poll bit in a RLC PDU to 1) after transmitting a certain amount data or packets or upon a detection that the threshold occupancy of the buffer memory is met. If the RLC entity does not receive any feedback from the peer or receiving device, the RLC entity may retransmit a poll request. To expedite the retransmission, the RLC entity may transmit a reception status request without waiting for the period (e.g., a reception status poll trigger) to elapse so that an ACK may be received from the peer or receiving device at an earlier time. For instance, the wireless communication device may utilize one or more components, such as the processor 402 and 502, the packet communication module 408 and 508, the transceiver 410 and 510, the modem 412 and 512, and the one or more antennas 416 and 516, to transmit a reception status poll request for an unacknowledged data packet (buffered at the buffer memory) before a reception status poll trigger.

In some aspects, the wireless communication device may expedite the retransmission by initiating a PDCP retransmission of a packet (buffered at the buffer memory) pending on an ACK as shown at the block 738. A PDCP entity (e.g., the PDCP entity 220) at the wireless communication device may initiate a retransmission of a packet (buffered at the buffer memory) pending on an ACK and may additionally release or discard the packet from the buffer memory after the retransmission. In some instances, if the unacknowledged packet is previously transmitted via the first wireless communication link using the first RAT, the PDCP entity may retransmit the unacknowledged packet via the second wireless communication link using the second RAT, for example, based on the second wireless communication link providing a higher throughput or having a better channel condition than the first wireless communication link. In some instances, the PDCP entity may retransmit the unacknowledged packet via the first wireless communication link using the first RAT. In some instances, the PDCP entity may retransmit the unacknowledged packet via the first wireless communication link using the first RAT and the second wireless communication link using the second RAT. For instance, the wireless communication device may utilize one or more components, such as the processor 402 and 502, the packet communication module 408 and 508, the transceiver 410 and 510, the modem 412 and 512, and the one or more antennas 416 and 516, to retransmit the unacknowledged data packet via the second wireless communication link using the second RAT based on the unacknowledged data packet being a packet transmitted via the first wireless communication link using the first RAT, and release the unacknowledged data packet from the buffer memory after the retransmitting.

Returning to the block 710, if the wireless communication device determines that the threshold occupancy of the buffer memory is not satisfied, the wireless communication device proceeds to block 720. At block 720, the wireless communication device performs retransmission based on an ACK timeout (e.g., according to a normal ARQ retransmission timeline without the retransmission acceleration mechanisms discussed above).

The expediting of the retransmission at the RLC level and/or at the PDCP level can enable an unacknowledged packet due to packet loss to be delivered successfully at an earlier time than a ARQ timeline of the first RAT or the second RAT. The expediting of the ACK transmission can enable the RLC receiver at the peer side to acknowledge a packet at an earlier time than a ARQ timeline of the first RAT or the second RAT. When the ACK is received earlier, the packet can be released from the buffer memory at an earlier time, and thus may reduce the occurrence of a memory overflow.

FIG. 8 is a flow diagram of a packet communication method 800 according to some aspects of the present disclosure. The method 800 may be implemented in conjunction with the method 600. For instance, the block 670 of FIG. 6 may implement the method 800 to monitor the buffer memory status. Aspects of the method 800 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the transceiver 410, the modem 412, and the one or more antennas 416, to execute the steps of method 800 when implementing a UL split bearer configuration. As illustrated, the method 800 includes a number of enumerated steps, but aspects of the method 800 may include additional steps before, after, and in between the enumerated steps. In some aspects, one or more of the enumerated steps may be omitted or performed in a different order.

Generally speaking, the block 810 includes features similar to block 710 of the method 700 in many respects. Accordingly, for sake of brevity, details of block 810 will not be repeated here.

If the wireless communication device determines that the threshold occupancy of the buffer memory is satisfied at block 810, the wireless communication device proceeds to block 830. At block 830, the wireless communication device delays new transmission (e.g., initial transmission of a new packet). For instance, the wireless communication device may utilize one or more components, such as the processor 402 and 502, the packet communication module 408 and 508, the transceiver 410 and 510, the modem 412 and 512, and the one or more antennas 416 and 516, to delay a new transmission.

The wireless communication device may delay a new transmission by simulating a degradation over the wireless communication link with the higher throughput as shown in the blocks 832, 834, 836, 837, and/or 838. For instance, the second wireless communication link is ahead of the first wireless communication link in terms of packet transmissions. In some aspects, the wireless communication device may delay a new transmission by discarding a UL scheduling grant as shown at the block 832. A wireless communication device may receive a UL grant from a BS (e.g., the BSs 105 and/or 500). The wireless communication device may discard the UL grant without using the UL grant to transmit a new packet (e.g., a PDCP packet 304) so that a retransmission may be performed instead. For instance, the wireless communication device may utilize one or more components, such as the processor 402 and 502, the packet communication module 408 and 508, the transceiver 410 and 510, the modem 412 and 512, and the one or more antennas 416 and 516, to discard the UL grant and omit or skip the transmission of a new packet (received from an upper layer) instead of using the UL grant for the new packet transmission.

In some aspects, the wireless communication device may delay a new transmission by reporting a reduced PHR as shown at the block 834. A wireless communication device may transmit a first packet using a certain MCS and at a certain transmission power level over the second wireless communication link (e.g., the faster link). The wireless communication device may determine a remaining power headroom based on the transmission power level and report the remaining power headroom in the PHR to a BS (e.g., the BSs 105 and/or 500). The BS may use the reported PHR to determine a scheduling (e.g., a MCS) for a next transmission. By reporting a reduced PHR, the BS may be more conservative in scheduling a next transmission, for example, by selecting a lower order MCS. Thus, the reduced PHR in turn serves to slow down the transmission over the faster second wireless communication link. For instance, the wireless communication device may utilize one or more components, such as the processor 402 and 502, the packet communication module 408 and 508, the transceiver 410 and 510, the modem 412 and 512, and the one or more antennas 416 and 516, to transmit a PHR indicating a lower power headroom than the actual power headroom computed from the transmission power level used for transmitting the first packet.

In some aspects, the wireless communication device may delay a new transmission by delaying a scheduling request as shown at the block 836. A wireless communication device may transmit a scheduling request to a BS (e.g., the BSs 105 and/or 500) and the BS may respond by granting the wireless communication device a transmission grant. Thus, by delay scheduling request, the wireless communication device in turn delay a new transmission. For instance, the wireless communication device may utilize one or more components, such as the processor 402 and 502, the packet communication module 408 and 508, the transceiver 410 and 510, the modem 412 and 512, and the one or more antennas 416 and 516, to delay a scheduling request transmission.

In some aspects, the wireless communication device may delay a new transmission by reporting a reduced amount of data ready for transmission at the block 837. A wireless communication device may transmit a buffer status report (BSR) indicating an amount of the data ready for transmission to a BS (e.g., the BSs 105 and/or 500). The BS may respond to the BSR by allocating resources for the wireless communication device based on the amount of data indicated by the BSR and scheduling the wireless communication device to transmit using the allocated resources. Thus, by reporting a reduced amount of data in a BSR, the BS may allocate a less amount of resources for the wireless communication device to transmit, thus delaying a new transmission. For instance, the wireless communication device may utilize one or more components, such as the processor 402 and 502, the packet communication module 408 and 508, the transceiver 410 and 510, the modem 412 and 512, and the one or more antennas 416 and 516, to generate a BSR indicating a data amount that is less than the amount of data ready for transmission at the wireless communication device.

In some aspects, the wireless communication device may delay a new transmission by transmitting a packet at a reduced transmission power as shown at the block 838. A wireless communication device may transmit a packet using a certain MCS and a certain transmission power. For instance, a BS may schedule the wireless communication device with a certain MCS based on a certain operating SNR supported by the second wireless communication link (e.g., the faster NR link). To delay a new transmission, the wireless communication device may transmit the packet at a reduced transmission power and thus the SNR may be lower. As such, the transmission may be received at the BS with lower quality and thus the BS may schedule the wireless communication device with a lower order MCS for a next transmission. For instance, the wireless communication device may utilize one or more components, such as the processor 402 and 502, the packet communication module 408 and 508, the transceiver 410 and 510, the modem 412 and 512, and the one or more antennas 416 and 516, to transmit a packet at a reduced transmission power over the second wireless communication link.

Returning to the block 810, if the wireless communication device determines that the threshold occupancy of the buffer memory is not satisfied, the wireless communication device proceeds to block 820. At block 820, the wireless communication device performs a new transmission, for example, as scheduled by the BS without modifying a transmission power or PHR.

In some aspects, the wireless communication device may control the number of bytes being transmitted on each wireless communication link such that both links are not more than M number of packets apart from the PDCP perspective. For instance, if the second wireless communication link (e.g., an NR link) has the higher throughput and/or higher SNR than the first wireless communication link (e.g., an LTE link), the wireless communication device may route a greater number of data packets to the second wireless communication link and a less number of data packets to the first wireless communication link. A PDCP entity may determine the amount of data for transmission over the second wireless communication link and the amount of data for transmission over the first wireless communication link based on a throughput ratio and/or an SNR ratio between the second wireless communication link and the first wireless communication link.

Figure 9:
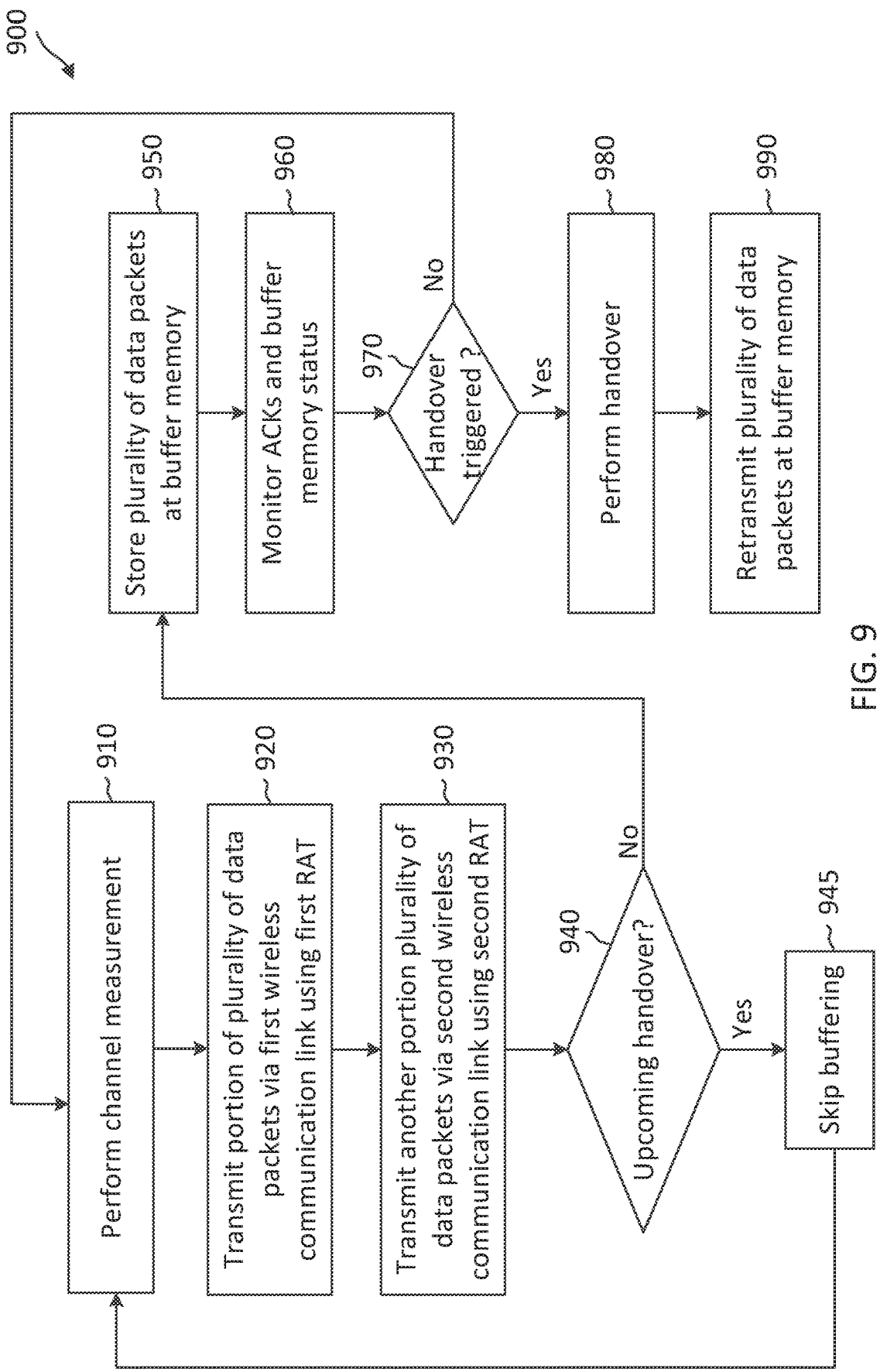
FIG. 9 is a flow diagram of a packet communication method according to some aspects of the present disclosure.

FIG. 9 is a flow diagram of a packet communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the transceiver 410, the modem 412, and the one or more antennas 416, to execute the steps of method 900 when implementing a UL split bearer configuration. As illustrated, the method 900 includes a number of enumerated steps, but aspects of the method 900 may include additional steps before, after, and in between the enumerated steps. In some aspects, one or more of the enumerated steps may be omitted or performed in a different order.

In the method 900, the wireless communication device is configured with a split radio bearer configuration similar to the split radio bearer configuration discussed above with reference to FIG. 2, where a PDCP entity (e.g., the PDCP entity 220) at the wireless communication device is split into two radio interface protocol interfaces for OTA transmissions (e.g., via an LTE link and an NR link). The PDCP entity may buffer transmitted packets when an upcoming handover is detected, for example, based on channel measurements. The method 900 may utilize similar mechanisms as discussed above in the methods 600, 700, and/or 800 with references to FIGS. 6, 7, and/or 8, respectively, to manage the buffer memory when transmitted packets are buffered at the buffer memory. The method 900 may be implemented in conjunction with the methods 600, 700 and/or 800.

At block 910, the wireless communication device performs channel measurement. The wireless communication device may determine channel measurements (e.g., RSRP and/or RSRQ measurements) of a serving cell. A wireless communication device may be served by an LTE BS (e.g., the BSs 105 and/or 400) and an NR BS (e.g., the BSs 105 and/or 400). In some instances, the LTE BS may be primary serving BS and the NR BS may be a secondary serving BS. In some other instances, the BR BS may be primary serving BS and the LTE BS may be a secondary serving BS. The wireless communication device may determine the RSRP and/or RSRQ based on reference signals (e.g., CSI-RSs) and/or broadcast system information signals (e.g., PBCH signals and/or SSBs) received from the LTE BS and/or the NR BS. In some instances, the wireless communication device may utilize one or more components, such as the processor 402, the packet communication module 408, the handover module 409, the transceiver 410, the modem 412, and the one or more antennas 416, to determine RSRP and/or RSRQ measurement of the primary and/or secondary serving cells.

At block 920, the wireless communication device transmits a portion of a plurality of data packets (e.g., the PDCP data packets 304) via a first wireless communication link (e.g., the wireless communication link 204) using a first RAT (e.g., LTE), for example using similar mechanisms as described above at block 610 with reference to FIG. 6.

At block 930, the wireless communication device transmits another portion of a plurality of data packets via a second wireless communication link using a second RAT (e.g., NR), for example using similar mechanisms as described above at block 610 with reference to FIG. 6.

At block 940, the wireless communication device determines whether there is an upcoming handover. In some aspects, the wireless communication device may determine whether there is an upcoming handover based on a channel measurement of a serving cell. A wireless communication device may determine that a potential handover may be upcoming when the channel measurement of the serving cell is below a threshold channel measurement. For instance, the wireless communication device may utilize one or more components, such as the processor 402, the packet communication module 408, the handover module 409, the transceiver 410, the modem 412, and the one or more antennas 416, to determine a RSRP of the LTE BS, a RSRQ of the LTE BS, a RSRP of the NR BS, or the RSRQ of the NR BS is below the threshold channel measurement (e.g., indicating a handover may be imminent). In some instances, the wireless communication device may use different channel measurement thresholds for RSRP and RSRQ comparisons. Additionally or alternatively, the wireless communication device may determine that a potential handover may be upcoming upon receiving a channel measurement report trigger from the serving BS. For instance, the BS may request the wireless communication device to report measurements of neighboring cells so that the BS may select a target BS for a potential handover. For instance, the wireless communication device may utilize one or more components, such as the processor 402, the packet communication module 408, the handover module 409, the transceiver 410, the modem 412, and the one or more antennas 416, to determine that a handover may be imminent upon receiving a channel measurement report trigger from the serving BS. If the wireless communication device determines that the channel measurement does not satisfy the threshold channel measurement, the wireless communication devices proceeds to block 950.

At block 950, the wireless communication device stores the plurality of data packets at a buffer memory (e.g., the buffer memory 302, the memory 404 and/or 504), for example using similar mechanisms as described above at block 630 with reference to FIG. 6.

At block 960, the wireless communication device monitors for ACKs and buffer memory status, for example, using mechanisms described at the blocks 640, 650, 660, and 670 of the method 600. The wireless communication device may control the amount of data being routed through the first wireless communication link and the second wireless communication link based on an occupancy threshold of the buffer memory. For instance, the wireless communication device may implement the method 700 discussed above with reference to FIG. 7 to expedite retransmissions and/or the method 800 discussed above with reference to FIG. 8 to delay new transmission based on the buffer memory status monitoring.

At block 970, the wireless communication device determines whether a handover is triggered, for example, by the primary serving BS (e.g., the LTE BS or the NR BS). For instance, the primary serving BS may also request the wireless communication device to report channel measurements of neighboring cells. The primary serving BS may select a target cell for a handover of the wireless communication device based on the channel measurement reports and transmit a handover instruction or trigger to the wireless communication device. The handover trigger may indicate the target BS for the handover and information (e.g., random access) for accessing the target BS. In some instances, the wireless communication device may utilize one or more components, such as the processor 402, the packet communication module 408, the handover module 409, the transceiver 410, the modem 412, and the one or more antennas 416, to receive the handover trigger. If the wireless communication device determines that no handover is triggered, the wireless communication device returns to the block 910. Otherwise, the wireless communication device proceeds to block 980.

At block 980, the wireless communication device performs a handover in response to the handover trigger. A wireless communication device may perform a contention free random access procedure to establish an RRC connection with the target BS based on the information provided by the handover trigger. After establishing the RRC connection with the target BS, the wireless communication device may perform a PDCP re-establishment procedure with the target BS.

At step 990, the wireless communication device retransmits the plurality of packets buffered at the buffer memory to the target BS.

Returning to block 940, if the wireless communication device determines that the channel measurement satisfies the threshold channel measurement, the wireless communication devices proceeds to block 945. At block 945, the wireless communication device skips buffering the plurality of transmitted packets and returns to block 910.

As can be observed, the storing or buffering of the transmitted packets when a handover is imminent allows the wireless communication device to retransmit all the transmitted packets to the target BS after the handover. For instance, the source BSs (e.g., the serving LTE BS and/or the NR BS) may not forward all packets received from the wireless communication device (buffered a reordering buffer) during a handover. The source BSs may rely on the wireless communication device to retransmit the packets that are buffered at the buffer memory of the wireless communication device, where at least a lowest sequence numbered packet (e.g., a lowest PDCP SN) at the buffer memory is pending on an ACK.

Figure 10:
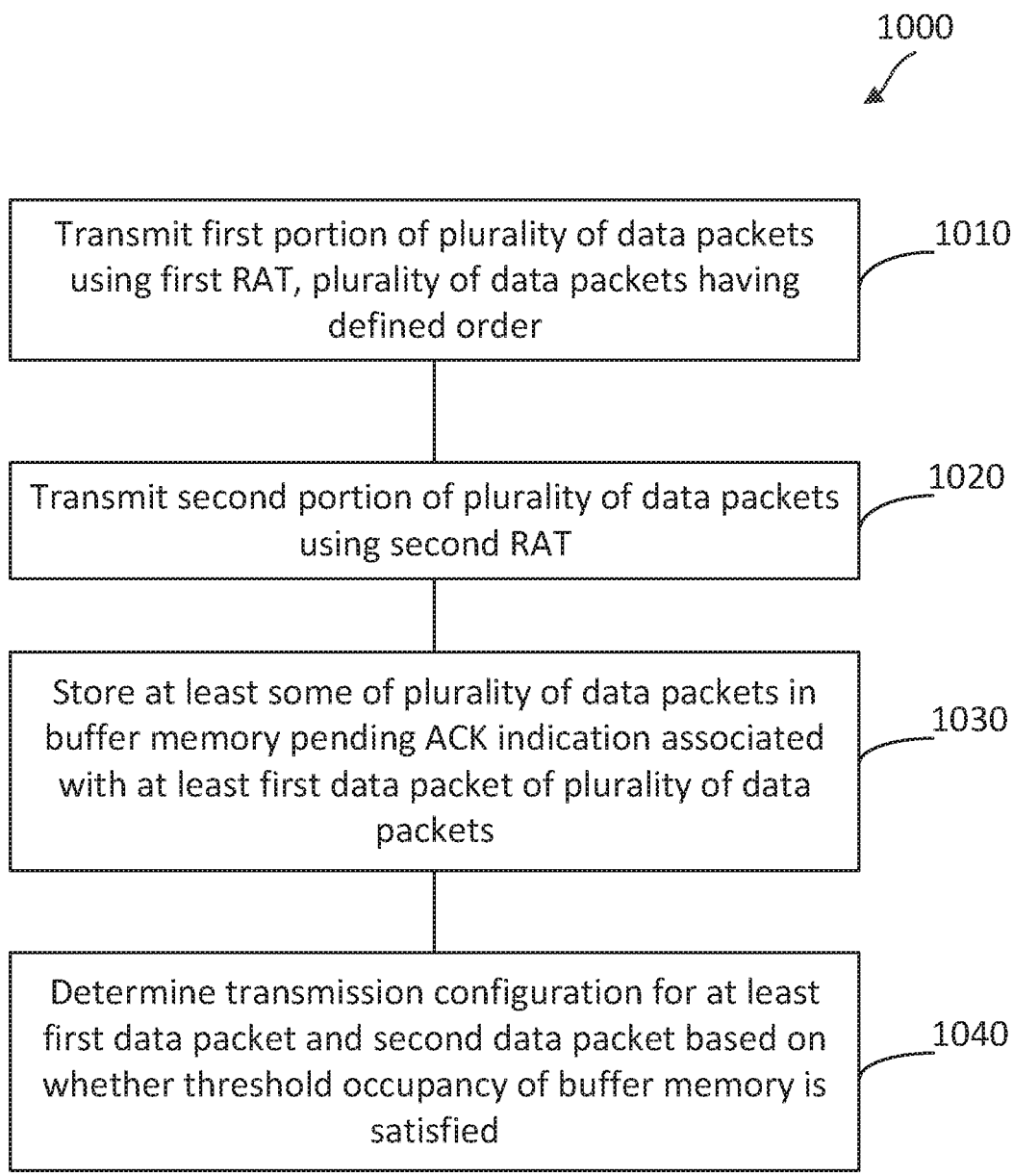
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the transceiver 410, the modem 412, and the one or more antennas 416, to execute the steps of method 1000 when implementing a UL split bearer configuration. Alternatively, a wireless communication device, such as the BS 105 or 500, may utilize one or more components, such as the processor 502, the memory 504, the packet communication module 508, the transceiver 510, the modem 512, and the one or more antennas 516, to execute the steps of method 1000 when implementing a DL split bearer configuration. The method 1000 may employ similar mechanisms as in the methods 600, 700, 800, and/or 900 described above with respect to FIGS. 6, 7, 8, and/or 9, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the wireless communication device transmits a first portion of a plurality of data packets (e.g., the PDCP data packets 304) using a first RAT (e.g., LTE). For instance, the wireless communication device may utilize one or more components, such as the processor 402 and 502, the packet communication module 408 and 508, the transceiver 410 and 510, the modem 412 and 512, and the one or more antennas 416 and 516, to transmits the first portion of the plurality of data packets using the first RAT. The plurality of data packets has a defined order. For instance, each data packet of the plurality of data packets is associated with a PDCP SN assigned by a PDCP entity (e.g., the PDCP entity 220) of the wireless communication device.

At block 1020, the wireless communication device transmits a second portion of a plurality of data packets using a second RAT (e.g., NR). For instance, the wireless communication device may utilize one or more components, such as the processor 402 and 502, the packet communication module 408 and 508, the transceiver 410 and 510, the modem 412 and 512, and the one or more antennas 416 and 516, to transmits the second portion of the plurality of data packets using the second RAT.

At block 1030, the wireless communication device stores at least some of the plurality of data packets in a memory (e.g., buffer memory) pending an ACK indication associated with at least a first data packet of the plurality of data packets. For instance, the wireless communication device may utilize one or more components, such as the processor 402 and 502, the packet communication module 408 and 508, to store at least some of the plurality of data packets at the memory (e.g., the memory 302, 404, and/or 504) pending an ACK indication associated with at least the first data packet of the plurality of data packets. The wireless communication device may determine to hold the plurality of data packets at the memory when a lowest sequence numbered packet of the plurality of data packets is pending on an ACK or confirmation from the peer or receiving side. For instance, when the wireless communication device corresponds to a UE (e.g., the UEs 115, 215, and/or 400), the peer side is the network and the transmission of the plurality of data packets is in a UL direction. Alternatively, when the wireless communication device corresponds to a BS (e.g., the BSs 105 and/or 500, the peer side is a UE and the transmission of the plurality of data packets is in a DL direction.

In some aspects, the memory may be a stand-alone memory storage and/or integrated into a general memory of the wireless communication device. The storing of the data packets at the memory can occur in a variety of forms. In some instances, the wireless communication device may utilize a first buffer memory to hold data packets that are to be processed and operated on by a modem (e.g., the modems 412 and 512) to prepare for transmission. Depending on the processing architecture of the wireless communication device, the first buffer memory may be overwritten or refreshed once the transmission is completed. To facilitate a potential retransmission of one or more of the data packets, the wireless communication device may copy the data packets from the first buffer memory to a second buffer memory before the first buffer memory is overwritten or refreshed and the second buffer memory may hold the data packets pending on ACKs. As such, the second buffer memory may be referred to as a retransmission buffer. In this case, the memory at block 1030 may correspond to the second buffer memory. In some other instances, the first buffer memory may not be overwritten or refreshed after transmission, and thus may continue to hold the data packets while waiting on ACKs. In this case, the memory at block 1030 may correspond to the first buffer memory.

At block 1040, the wireless communication device determines a transmission configuration for at least the first data packet and a second data packet based on a threshold occupancy of the memory is satisfied. Transmission configuration determination generally refers to how a packet may be transmitted or re-transmitted and/or triggering of an ACK transmission at a peer or receiving device. The detection/determination of the threshold occupancy and the determination of the transmission configuration are discussed below.

In some aspects, the wireless communication device may determine the transmission configuration at the block 1040 in response to a detection that an amount of the plurality of transmitted data packets stored at the memory satisfies the threshold occupancy of the memory. In some aspects, the wireless communication device may determine the transmission configuration at the block 1040 in response to a detection that an amount of unacknowledged data packets of the plurality of data packets stored at the memory satisfies the threshold occupancy of the memory. In some aspects, the wireless communication device may determine the transmission configuration at the block 1040 in response to a detection that a difference between a first sequence number (e.g., a PDCP SN) of a packet in the first portion of the plurality of data packets (transmitted using the first RAT) the a second sequence number (e.g., a PDCP SN) of a packet in the second portion of the plurality of data packets (transmitted using the second RAT) satisfies the threshold occupancy of the memory. For instance, the wireless communication device may identify the first sequence number as a lowest sequence numbered packet that was transmitted using the first RAT and pending on ACK and may identify the second sequence number as a lowest sequence numbered packet that was transmitted using the second RAT and with a reception of an acknowledgement.

In some aspects, the determining the transmission configuration at the block 1040 includes determining a schedule for retransmitting the first data packet without waiting for an NACK to expedite the retransmission using mechanisms described above in the method 700 with reference to FIG. 7 upon detecting that the threshold occupancy of the memory is satisfied. In some aspects, the determining the transmission configuration at the block 1040 includes determining a schedule for transmitting a RLC status poll trigger to expedite an ACK transmission from the peer or receiving device using mechanisms described above in the method 700 with reference to FIG. 7 upon detecting that the threshold occupancy of the memory is satisfied. For instance, the wireless communication device may retransmit the first data packet without receiving a NACK (e.g., an unsolicited retransmission at an RLC level or a PDCP level), duplicate a transmission of the first data packet (e.g., via the first RAT and the second RAT), and/or transmit a reception status poll request to expedite the reception of an ACK for the first data packet.

In some aspects, the determining the transmission configuration at the block 1040 includes delaying the transmission of the second data packet (e.g., the new packet) using mechanisms described above in the method 800 with reference to FIG. 8 upon detecting that the threshold occupancy of the memory is satisfied. For instance, the wireless communication device may discard a UL scheduling grant, report BSR indicating an amount of data less than the amount of data ready for transmission at the wireless communication device, transmit the second data packet at reduced power, report a PHR less than the PHR available at the wireless communication device, and/or delay a scheduling request transmission.

In some aspects, the first portion of the plurality of data packets are transmitted using the first RAT over a first wireless communication link (e.g., the wireless communication link 204) and the second portion of the plurality of data packets are transmitted using the second RAT over a second first wireless communication link (e.g., the wireless communication link 206). The wireless communication device may also determine to split the plurality of data packets into the first portion and the second portion based on a throughput ratio and/or a SNR ratio between the first wireless communication link and the second wireless communication link.

Figure 11:
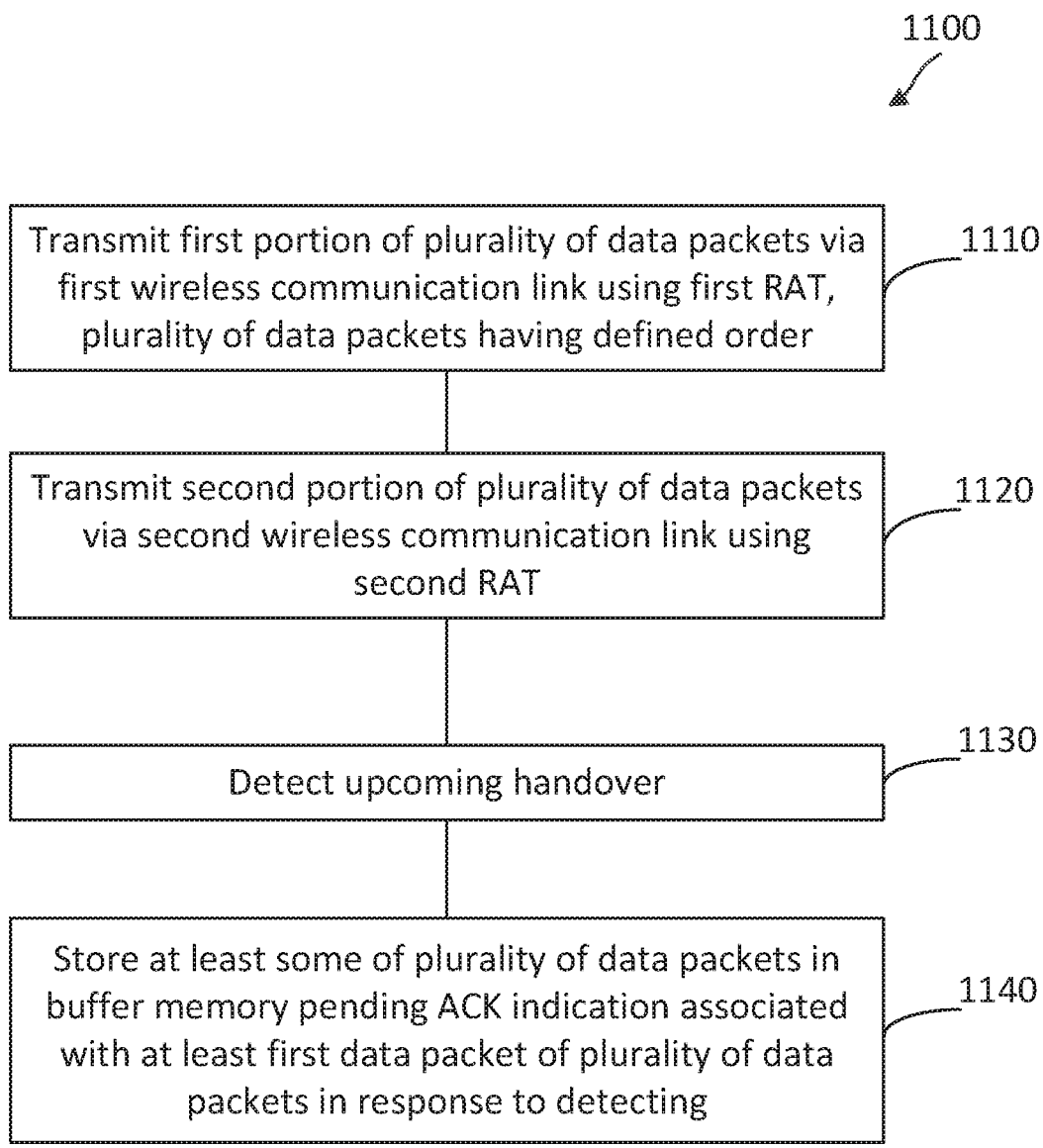
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UE 115, 215, or 400, may utilize one or more components, such as the processor 402, the memory 404, the packet communication module 408, the handover module 409, the transceiver 410, the modem 412, and the one or more antennas 416, to execute the steps of method 1000 when implementing a UL split bearer configuration. The method 1100 may employ similar mechanisms as in the methods 600, 700, 800, 900, and/or 1000 described above with respect to FIGS. 6, 7, 8, 9, and/or 10, respectively. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the wireless communication device transmits a first portion of a plurality of data packets (e.g., the PDCP data packets 304) via a first wireless communication link (e.g., the wireless communication link 204) using a first RAT (e.g., LTE). The plurality of data packets have a defined order. For instance, each data packet of the plurality of data packets is associated with a PDCP SN assigned by a PDCP entity (e.g., the PDCP entity 220) of the wireless communication device. For instance, the wireless communication device may utilize one or more components, such as the processor 402, the packet communication module 408, the transceiver 410, the modem 412, and the one or more antennas 416, to transmits the first portion of the plurality of data packets via the first wireless communication link using the first RAT.

At block 1120, the wireless communication device transmits a second portion of a plurality of data packets via a second wireless communication link using a second RAT (e.g., NR). For instance, the wireless communication device may utilize one or more components, such as the processor 402, the packet communication module 408, the transceiver 410, the modem 412, and the one or more antennas 416, to transmits the second portion of the plurality of data packets via the second wireless communication link using the second RAT.

At block 1130, the wireless communication device detects an upcoming handover. In some aspects, the wireless communication device may detect the upcoming handover based on a channel measurement associated with at least one of the first wireless communication link or the second wireless communication link being below a threshold measurement. For instance, the wireless communication device may utilize one or more components, such as the processor 402, the packet communication module 408, the handover module 409, the transceiver 410, the modem 412, and the one or more antennas 416, to perform channel measurement (e.g., RSRP and/or RSRQ) for the first wireless communication link and/or the second wireless communication link and determine whether a handover is upcoming based on a comparison of the channel measurement against the threshold measurement. In some aspects, the wireless communication device may detect the upcoming handover based on receiving a channel measurement report trigger. For instance, the wireless communication device may utilize one or more components, such as the processor 402, the packet communication module 408, the handover module 409, the transceiver 410, the modem 412, and the one or more antennas 416, to receive a channel measurement report trigger and determine that a handover is upcoming based on the channel measurement report trigger.

At block 1140, the wireless communication device stores at least some of the plurality of data packets in a memory (e.g., buffer memory) pending an ACK indication associated with a first data packet of the plurality of data packets in response to the detecting. For instance, the wireless communication device may utilize one or more components, such as the processor 402, the packet communication module 408, to store the plurality of data packets at the memory (e.g., the memory 302, 404, and/or 504). The wireless communication device may determine to hold the plurality of data packets at the memory when a lowest sequence numbered packet of the plurality of data packets is pending on an ACK or confirmation from the network side. In some instances, the storing of the data packets at the memory can occur in a variety of forms as discussed above at block 1030 of the method 1000.

In some aspects, the wireless communication device may determine a transmission configuration. Transmission configuration determination generally refers to how a packet may be transmitted or re-transmitted and/or triggering of an ACK transmission at a peer or receiving device. For example, in some scenarios, a communication device may determine to expedite a retransmission of the first data packet and/or triggering a reception status from a peer device using mechanisms described above in the method 700 with reference to FIG. 7 and/or delay an initial transmission of a second data packet (e.g., the new packet) using mechanisms described above in the method 800 with reference to FIG. 8.

In some aspects, the wireless communication device may subsequently receive a handover trigger (e.g., indicating a target BS) and may perform a handover. After the handover to the target BS, the wireless communication device may retransmit the packets stored at the memory to the target BS during a PDCP re-establishment with the target BS, for example, as shown in the method 900. In some other aspects, the wireless communication device may subsequently detects that the channel measurements increase above the threshold measurement, and thus the wireless communication device may stop storing transmitted packets at the memory and may flush or release the plurality of data packets from the memory.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a wireless communication device, a first portion of a plurality of data packets using a first radio access technology (RAT);
   transmitting, by the wireless communication device, a second portion of the plurality of data packets using a second RAT different from the first RAT;
   storing, by the wireless communication device, at least some of the plurality of data packets in a memory pending an acknowledgement (ACK) indication associated with at least a first data packet of the plurality of data packets;
   determining, by the wireless communication device, a transmission configuration for at least the first data packet and a second data packet based on whether a threshold occupancy of the memory is satisfied; and
   retransmitting, by the wireless communication device in response to the transmission configuration, at least a portion of the first data packet using at least one of the first RAT or the second RAT without receiving a negative-acknowledgement (NACK) for the first data packet.

2. The method of claim 1, wherein the determining the transmission configuration is performed in response to an amount of the plurality of data packets stored at the memory satisfies the threshold occupancy of the memory.

3. The method of claim 1, wherein the determining the transmission configuration is performed in response to an amount of unacknowledged data packets of the plurality of data packets stored at the memory satisfies the threshold occupancy of the memory.

4. The method of claim 1, further comprising:
   identifying, by the wireless communication device, a first packet data convergence protocol (PDCP) sequence number (SN) associated with a data packet in the first portion of the plurality of data packets transmitted using the first RAT; and
   identifying, by the wireless communication device, a second PDCP SN associated with a data packet in the second portion of the plurality of data packets transmitted using the second RAT,
   wherein the determining the transmission configuration is performed in response to a difference between the first PDCP SN and the second PDCP SN satisfies the threshold occupancy of the memory.

5. The method of claim 1, further comprising:
   retransmitting, by the wireless communication device in response to the transmission configuration, at least a portion of the first data packet using the first RAT and the second RAT.

6. The method of claim 1, further comprising:
   retransmitting, by the wireless communication device in response to the transmission configuration, the first data packet using the second RAT based on the first data packet being a packet in the first portion the plurality of data packets transmitted using the first RAT.

7. The method of claim 1, further comprising:
   transmitting, by the wireless communication device in response to the transmission configuration, a reception status poll request for the first data packet.

8. The method of claim 1, further comprising:
transmitting, by the wireless communication device in response to the transmission configuration, a buffer status report (BSR) indicating a first data amount different than a second data amount ready for transmission;
receiving, by the wireless communication device, a resource allocation based on the first data amount; and
transmitting, by the wireless communication device, the second data packet based on the resource allocation.

9. The method of claim 1, further comprising:
transmitting, by the wireless communication device in response to the transmission configuration, the second data packet at a modified transmission power level.

10. The method of claim 1, further comprising:
transmitting, by the wireless communication device, the second data packet using a first transmission power; and
transmitting, by the wireless communication device in response to the transmission configuration, a power headroom report (PHR) indicating a power headroom different from a power headroom associated with the first transmission power.

11. The method of claim 1, further comprising:
determining, by the wireless communication device, to split the plurality of data packets into the first portion and the second portion based on a throughout ratio between a first wireless communication link of the first RAT and a second wireless communication link of the second RAT,
wherein the transmitting the first portion of the plurality of data packets includes:
transmitting, by the wireless communication device, the first portion of the plurality of data packets via the first wireless communication link; and
wherein the transmitting the second portion of the plurality of data packets includes:
transmitting, by the wireless communication device, the second portion of the plurality of data packets via the second wireless communication link.

12. A method of wireless communication, comprising:
transmitting, by a wireless communication device to a network, a first portion of a plurality of data packets via a first wireless communication link using a first radio access technology (RAT), the plurality of data packets having an order;
transmitting, by the wireless communication device to the network, a second portion of the plurality of data packets via a second wireless communication link using a second RAT, the second wireless communication link being different from the first wireless communication link, and the second RAT being different from the first RAT;
detecting, by the wireless communication device, an upcoming handover;
storing, by the wireless communication device in response to the detecting, at least some of the plurality of data packets in a memory pending an acknowledgement (ACK) indication associated with at least a first data packet of the plurality of data packets; and
retransmitting, by the wireless communication device, the first portion of the plurality of data packets using at least one of the first RAT or the second RAT without receiving a negative-acknowledgement (NACK) for the first portion of the plurality of data packets.

13. The method of claim 12, wherein the detecting the upcoming handover is in response to:
determining, by the wireless communication device, a channel measurement associated with at least one of the first wireless communication link or the second wireless communication link being below a threshold measurement.

14. The method of claim 13, wherein the channel measurement includes at least one of:
a reference signal received power (RSRP) measurement of the at least one of the first wireless communication link or the second wireless communication link; or
a reference signal received quality (RSRQ) measurement of the at least one of the first wireless communication link or the second wireless communication link.

15. The method of claim 12, wherein the detecting the upcoming handover is in response to a channel measurement report trigger.

16. The method of claim 12, further comprising:
determining, by the wireless communication device, a transmission configuration for at least the first data packet and a second data packet based on a detection that the plurality of data packets satisfies a threshold occupancy of the memory.

17. The method of claim 12, further comprising:
performing, by the wireless communication device, a handover to a neighboring cell in response to the detecting; and
retransmitting, by the wireless communication device, the plurality of data packets after the handover.

18. An apparatus comprising:
a transceiver configured to:
transmit a first portion of a plurality of data packets using a first radio access technology (RAT), the plurality of data packets having an order;
transmit a second portion of the plurality of data packets using a second RAT different from the first RAT; and
retransmit the first portion of the plurality of data packets using at least one of the first RAT or the second RAT without receiving a negative-acknowledgement (NACK) for the first portion of the plurality of data packets;
a memory configured to store at least some of the plurality of data packets pending an acknowledgement (ACK) indication associated with at least a first data packet of the plurality of data packets; and
a processor configured to determine a transmission configuration for at least the first data packet and a second data packet based on whether a threshold occupancy of the memory is satisfied.

19. The apparatus of claim 18, wherein the processor is further configured to determine the transmission configuration based on an amount of the plurality of data packets stored at the memory satisfies the threshold occupancy of the memory.

20. The apparatus of claim 18, wherein the processor is further configured to determine the transmission configuration based on an amount of unacknowledged data packets of the plurality of data packets stored at the memory satisfies the threshold occupancy of the memory.

21. The apparatus of claim 18, wherein:
the processor is further configured to:
identify a first packet data convergence protocol (PDCP) sequence number (SN) associated with a data packet in the first portion of the plurality of data packets transmitted using the first RAT;

identify a second PDCP SN associated with a data packet in the second portion of the plurality of data packets transmitted using the second RAT; and determine the transmission configuration based on a difference between the first PDCP SN and the second PDCP SN satisfies the threshold occupancy of the memory.

22. The apparatus of claim 18, wherein the transceiver is further configured to:

retransmit, in response to the transmission configuration, the first data packet using the second RAT based on the first data packet being a packet in the first portion the plurality of data packets transmitted using the first RAT.

23. The apparatus of claim 18, wherein the transceiver is further configured to:

transmit, in response to the transmission configuration, a reception status poll request for the first data packet based on the threshold occupancy of the memory.

24. The apparatus of claim 18, wherein the transceiver is further configured to:

transmit, in response to the transmission configuration, a buffer status report (BSR) indicating a first data amount different than a second data amount ready for transmission;

receive a resource allocation based on the first data amount; and transmit the second data packet based on the resource allocation.

25. The apparatus of claim 18, wherein the transceiver is further configured to:

transmit, in response to the transmission configuration, at least one of:

the second data packet at a modified transmission power level; or a modified power headroom report (PHR) for the second data packet.

26. The apparatus of claim 18, wherein the processor is further configured to:

determine to split the plurality of data packets into the first portion and the second portion based on a throughout ratio between a first wireless communication link of the first RAT and a second wireless communication link of the second RAT, wherein the first portion of the plurality of data packets are transmitted via the first wireless communication link, and wherein the second portion of the plurality of data packets are transmitted via the second wireless communication link.

27. An apparatus comprising:

a transceiver configured to:

transmit, to a network, a first portion of a plurality of data packets via a first wireless communication link using a first radio access technology (RAT), the plurality of data packets having an order;

transmit, to the network, a second portion of the plurality of data packets via a second wireless communication link using a second RAT, the second wireless communication link being different from the first wireless communication link, and the second RAT being different from the first RAT; and retransmit, to the network, the first portion of the plurality of data packets using at least one of the first RAT or the second RAT without receiving a negative-acknowledgement (NACK) for the first portion of the plurality of data packets;

a processor configured to detect an upcoming handover; and a memory configured to store, in response to the detection, at least some of the plurality of data packets pending an acknowledgement (ACK) indication associated with at least a first data packet of the plurality of data packets.

28. The apparatus of claim 27, wherein the processor is further configured to:

determine a transmission configuration for at least the first data packet and a second data packet based on a detection that the plurality of data packets satisfies a threshold occupancy of the memory.

* * * * *